US009392193B2

(12) United States Patent
Suzuki

(10) Patent No.: US 9,392,193 B2
(45) Date of Patent: Jul. 12, 2016

(54) IMAGE PICKUP APPARATUS, CONTROL METHOD THEREFOR AND IMAGE PICKUP SYSTEM

(71) Applicant: CANON KABUSHIKI KAISHA, Tokyo (JP)

(72) Inventor: Satoshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/371,158

(22) PCT Filed: Jan. 10, 2013

(86) PCT No.: PCT/JP2013/050865
§ 371 (c)(1),
(2) Date: Jul. 8, 2014

(87) PCT Pub. No.: WO2013/105672
PCT Pub. Date: Jul. 18, 2013

(65) Prior Publication Data
US 2015/0015756 A1    Jan. 15, 2015

(30) Foreign Application Priority Data

Jan. 13, 2012 (JP) .................................. 2012-005674

(51) Int. Cl.
H04N 5/355     (2011.01)
H04N 5/347     (2011.01)
(Continued)

(52) U.S. Cl.
CPC ............. *H04N 5/347* (2013.01); *H04N 5/2254* (2013.01); *H04N 5/23212* (2013.01); *H04N 5/3456* (2013.01); *H04N 5/3658* (2013.01); *H04N 5/3696* (2013.01); *H04N 5/37457* (2013.01)

(58) Field of Classification Search
CPC ... H04N 5/347; H04N 5/2254; H04N 5/3658; H04N 5/37457; H04N 5/3456; H04N 5/23212; H04N 5/3696
See application file for complete search history.

(56) References Cited

U.S. PATENT DOCUMENTS

2011/0129165 A1* 6/2011 Lim .................... H04N 5/23212
                                                          382/255
2011/0193983 A1   8/2011 Uchida

FOREIGN PATENT DOCUMENTS

EP    1 416 721 A2    5/2004
EP    2 309 541 A2    4/2011
(Continued)

OTHER PUBLICATIONS

Ng et al. "Light Field Photography with a hand-held Plenoptic Camera" Stanford Tech Report CTSR Feb. 2005.
(Continued)

Primary Examiner — Antoinette Spinks
Assistant Examiner — Padma Haliyur
(74) Attorney, Agent, or Firm — Cowan, Liebowitz & Latman, P.C.

(57) ABSTRACT

In an image pickup apparatus using an image pickup element including a plurality of photoelectric conversion means sharing a microlens, the number of pixels to be read is switched between the case of normal photographing and the case of live view driving. In the case of live view driving, only pixels positioned near the center of the optical axis of the microlens, the number of which is smaller than that in the case of normal photographing, are read. The image pickup apparatus realizes both normal photographing capable of acquiring an image in which the depth of field is small and which can be refocused, and live view photographing capable of displaying an image with a large depth of field and the high frame rate, thereby allowing the framing of the photographed image to be confirmed.

13 Claims, 27 Drawing Sheets

(51) Int. Cl.
*H04N 5/225* (2006.01)
*H04N 5/232* (2006.01)
*H04N 5/345* (2011.01)
*H04N 5/365* (2011.01)
*H04N 5/369* (2011.01)
*H04N 5/3745* (2011.01)

(56) References Cited

FOREIGN PATENT DOCUMENTS

| EP | 2 334 054 A1 | 6/2011 |
|---|---|---|
| JP | 2000059696 A | 2/2000 |
| JP | 2006310933 A | 11/2006 |
| JP | 2008182692 A | 8/2008 |
| JP | 2002158901 A1 | 5/2012 |
| WO | 2006/039486 A2 | 4/2006 |
| WO | 2011/081187 A1 | 7/2011 |

OTHER PUBLICATIONS

PCT/IB/326 (PCT Notification Concerning Transmittal of International Preliminary Report on Patentability).

PCT/IB/373 (PCT International Preliminary Report on Patentability).

PCT/ISA/237 (PCT Written Opinion of the International Searching Authority).

Sep. 24, 2015 Japanese Office Action, enclosed without an English Translation, that issued in Japanese Patent Application No. 2012-005674.

* cited by examiner

IMAGE PICKUP APPARATUS, CONTROL METHOD THEREFOR AND IMAGE PICKUP SYSTEM

CROSS-REFERENCE TO RELATED APPLICATIONS

This application is a national stage application of International Application No. PCT/JP2013/050865 filed Jan. 10, 2013, whose benefit is claimed and which claims the benefit of Japanese Patent Application No. 2012-005674, filed Jan. 13, 2012, the entire disclosures of which are incorporated herein by reference.

TECHNICAL FIELD

The present invention relates to an image pickup apparatus that picks up, records and reproduces a still image and a moving image, a control method therefor and an image pickup system including the image pickup apparatus. In particular, the present invention relates to an image pickup apparatus including a microlens array in front of an image pickup element, which is a configurational element of the image pickup apparatus, a control method therefor and an image pickup system including the image pickup apparatus.

BACKGROUND ART

Conventionally, there are many image pickup apparatuses, such as electronic cameras, which record and reproduce still images and moving images picked up by solid image pickup elements, such as CCD and CMOS, using memory cards including solid-state memory elements as a recording medium.

As an example of techniques related to these image pickup apparatuses, the non-patent literature 1 proposes an image pickup apparatus having a configuration providing a microlens array in front of a solid image pickup element such that each of lenses is arranged for a plurality of pixels (photoelectric conversion means). Such a configuration allows incident direction information of a light ray incident on the image pickup element to be acquired.

Use of such an image pickup apparatus allows not only generation of a normal photographed image based on an output signal from each pixel, but also reconstruction of an image which is focused at an arbitrary focal length by application of a predetermined image processing to a photographed image.

CITATION LIST

Non Patent Literature

NPL 1: Ren. Ng, and seven others, "Light Field Photography with a Hand-Held Plenoptic Camera", Stanford Tech Report CTSR 2005-02

SUMMARY OF INVENTION

Technical Problem

However, photography by the image pickup apparatus including the aforementioned microlens array has a following problem.

Most of recent image pickup apparatuses, such as digital cameras, have a live view (LV) function of displaying an object image to be photographed on a display device, such as a TFT (thin film transistor) display in real time. Main purposes of the LV function lie in "confirmation of framing" that confirms whether or not an object is correctly positioned in an image frame to be photographed, and "confirmation of focusing" that confirms whether or not the focus is on a main object to be photographed.

The image pickup apparatus according to the aforementioned conventional technique can generate an image on which the focus is correctly adjusted, by refocusing based on image processing after photographing. Accordingly, the main purpose of confirmation in the case of the LV function is not confirmation of focusing an object. Instead, this confirmation may be enough to include confirmation of whether the defocus amount is within a range allowing refocusing after photographing or not.

Meanwhile, confirmation of framing is necessary. Here, to allow the focus to be on objects in a wider distance range, the depth of field is desired to be larger in the case of LV driving.

However, this point is against the purpose of the image pickup apparatus as described above that allows refocusing after photographing.

To address this problem, a method can be considered that switches aperture systems between the case of normal photographing and the case of LV driving using a mechanical shutter. However, arrangement of the mechanical shutter increases the cost and size due to increase in components, which is not desirable.

Furthermore, photography by the image pickup apparatus including the aforementioned microlens array has another problem as follows.

A unit of pixel in an image generated by the image pickup apparatus is one pixel per microlens. A conventional image pickup element has a configuration of one pixel per microlens. Accordingly, pixel signals (photoelectric conversion signals) substantially as many as the number of image data to be generated may be read. However, the image pickup apparatus as described above has the configuration including several tens of pixels (photoelectric conversion elements) per microlens. Accordingly, the pixel signals several tens of times more than those of a conventional image pickup apparatus are required to be read and subjected to processing, such as addition, to thereby generate pixel signals of an LV image. This process causes a significantly great problem specifically in LV driving that requires a high speed rate.

Solution to Problem

To solve the problems, an image pickup apparatus of the present invention using an image pickup element including a plurality of photoelectric conversion means sharing a microlens switches the number of pixels to be read between the case of normal photographing and the case of live view driving. In the case of live view driving, a smaller number of pixels than those in the case of the normal photographing, for instance, only pixels positioned near the center of the optical axis of the microlens are read.

Advantageous Effects of Invention

According to the present invention, an image pickup apparatus including a microlens array can acquire an image with a small depth of field which can be refocused in the case of normal photographing, and display an image with a large depth of field which supports a high frame rate and in which the framing of the photographed image can be confirmed in the case of live view driving.

Further features of the present invention will become apparent from the following description of exemplary embodiments with reference to the attached drawings.

DESCRIPTION OF EMBODIMENTS

Hereinafter, referring to drawings, exemplary embodiments of the present invention will be described.

Example 1

Figure 1:
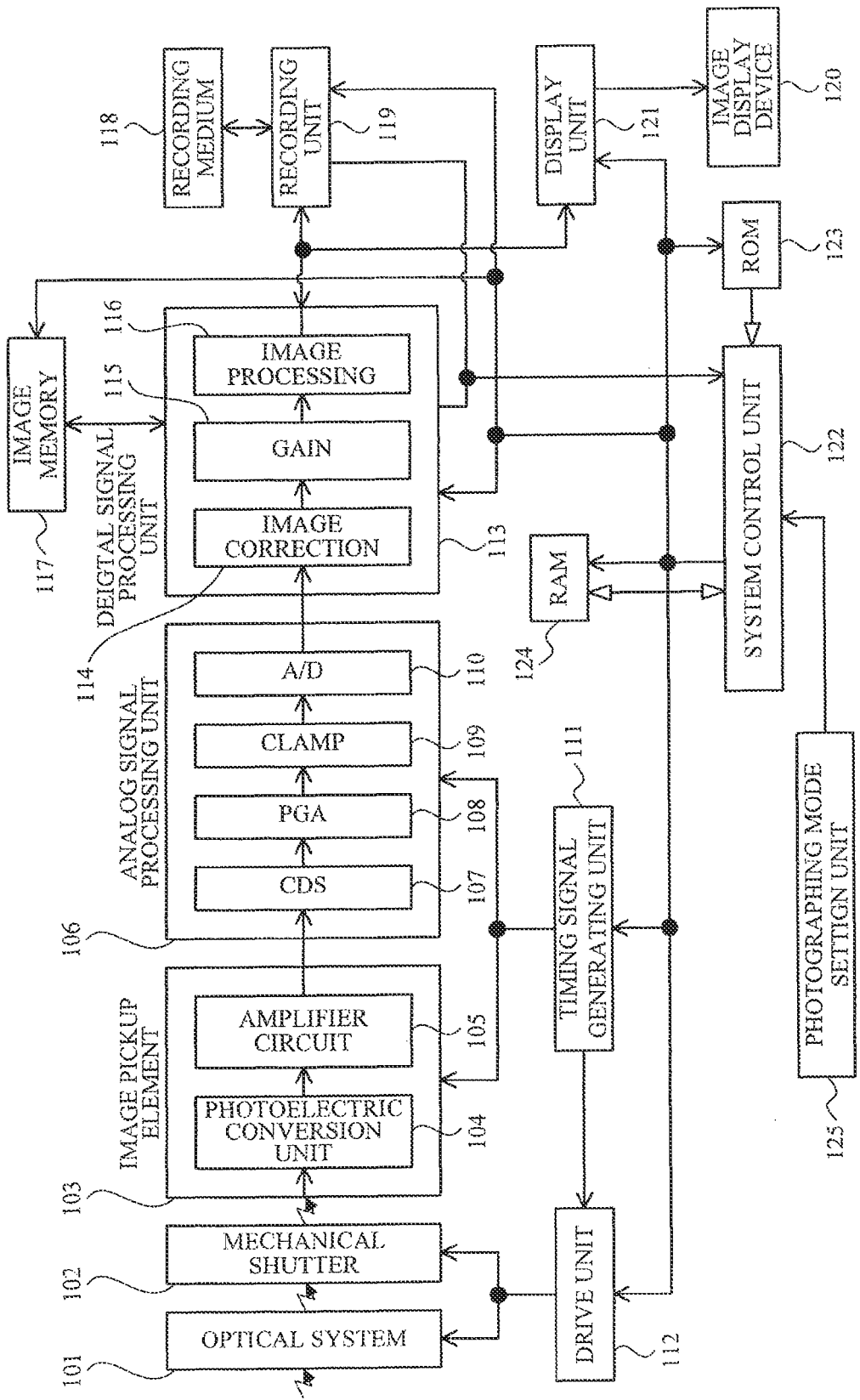
FIG. 1 is a block diagram of an image pickup apparatus according to Example 1 of the present invention.

FIG. 1 is a block diagram illustrating a configuration of an image pickup apparatus according to Example 1 of the present invention.

FIG. 1 illustrates an optical system 101, such as a lens, a mechanical shutter 102, an image pickup element 103 that outputs an electric signal is photoelectrically converted from an optical image, and a photoelectric conversion unit 104 that actually converts incident light into the electric signal in the image pickup element 103. The photoelectric conversion unit 104 includes a sensor array in which a plurality of pixels as photoelectric conversion means is two-dimensionally arranged.

A signal amplifier circuit 105 amplifies the electric signal in the image pickup element 103. An analog signal processing unit 106 performs analog signal processing on an image signal output from the image pickup element 103. A CDS circuit 107 performs correlated double sampling in the analog signal processing unit 106.

A signal amplifier 108 amplifies an analog signal in the analog signal processing unit 106. A clamp circuit 109 performs horizontal OB clamp in the analog signal processing unit 106. An A/D converter 110 converts the analog signal into a digital signal in the analog signal processing unit 106.

A timing signal generating unit 111 generates a signal for operating the image pickup element 103 and the analog signal processing unit 106. A drive unit 112 is for the optical system 101 and the mechanical shutter 102. A digital signal processing unit 113 performs digital signal processing required for a photographed image data. An image correction unit 114 performs a correction process required for the image data in the digital signal processing unit 113. A signal amplifier unit 115 amplifies the digital signal. An image processing unit 116 performs image processing required for the image data.

An image memory 117 stores the signal-processed image data. An image recording medium 118 (illustrated as a recording medium) can be removed from the image pickup apparatus. A recording unit 119 records the signal-processed image data in the image recording medium 118. An image display device 120 displays the signal-processed image data. A display unit 121 displays an image on the image display device 120.

A system control unit 122 controls the entire image pickup apparatus. A non-volatile memory (ROM) 123 stores a program including a control method executed by the system control unit 122, a control data, such as parameters and tables used when the program is executed, and a correction data, such as a defect address. A volatile memory (RAM) 124 stores the program, the control data and the correction data having been recorded in the non-volatile memory 123 and transferred to this memory, and used when the system control unit 122 controls the image pickup apparatus.

Photographing mode setting means 125 sets a photographing condition, such as ISO sensitivity, and switches between still image photographing (first photographing mode) and live view driving (second photographing mode).

A photographing operation of the image pickup apparatus having the above configuration will hereinafter be described. Before the photographing operation, on start of an operation of the system control unit 122, such as switch-on of the image pickup apparatus, the required program, control data and correction data are transferred from the non-volatile memory 123 to the volatile memory 124 and stored therein. These program and data are used when the system control unit 122 controls the image pickup apparatus. As necessary, an additional program and data are transferred from the non-volatile memory 123 to the volatile memory 124, and the system control unit 122 directly reads and uses the data in the non-volatile memory 123.

First, according to a control signal from the system control unit 122, the optical system 101, such as a lens, is driven to form an image of an object set at an appropriate brightness on the image pickup element 103. Next, on still image photographing, based on the control signal from the system control unit 122, the mechanical shutter 102 is driven to shield the image pickup element 103 from light such that a necessary exposure time is secured according to the operation of the image pickup element 103. At this time, in the case where the image pickup element 103 includes an electronic shutter function, this function may be used together with the mechanical shutter 102 to secure the necessary exposure time. On photographing a moving image and on LV driving, the mechanical shutter 102 is maintained at an open aperture state such that the image pickup element 103 is always exposed during photographing according to the control signal from the system control unit 122.

As described later, on LV driving, the image pickup apparatus according to the present invention reduces the number of pixels. Accordingly, the setting conditions of the optical system for attaining an appropriate exposure value are set different between the case of normal photographing and the case of LV driving. Instead, the amplifier circuit 105 in the image pickup element 103, the PGA circuit 108 in the analog signal processing unit 106 and the signal amplifier unit 115 in the digital signal processing unit 113 apply a gain to the image signal to achieve an appropriate amount of signal. That is, the gain is and switched to be changed according to the number of pixels used on LV driving, The image pickup element 103 is driven according to drive pulses based on operation pulses generated by the timing signal generating unit 111 controlled by the system control unit 122. According to this drive control, the photoelectric conversion signal is read from the photoelectric conversion unit 104. These components configure signal read-out means of the image pickup element. The photoelectric conversion unit 104 converts the image of the object into the electric signal by photoelectric conversion. The signal amplifier circuit 105 applies the gain of an amplification factor set according to the intensity of incident light to the electric signal from the photoelectric conversion unit 104, and outputs the signal as an analog image signal.

The analog image signal output from the image pickup element 103 is subjected to signal processing by the analog signal processing unit 106 according to the operation pulses generated by the timing signal generating unit 111 controlled by the system control unit 122. First, the CDS circuit 107 removes clock-synchronous noise. The PGA circuit 108 applies the gain of amplification factor set according to the intensity of incident light. The clamp circuit 109 clamps a signal output in the horizontal OB region as a reference voltage. The A/D converter 110 converts the signal into a digital image signal.

Next, the digital signal processing unit 113 controlled by the system control unit 122 performs image processing, such as color conversion, white balance and gamma correction, resolution conversion processing, and image compression processing on the digital image signal output from the analog signal processing unit 106. First, the image correction unit 114 performs various image correction processes, such as defect correction and dark shading correction. Next, the signal amplifier unit 115 applies the gain of the amplification factor set according to the intensity of incident light. The image processing unit 116 performs various pieces of image processing including image processing, such as color conversion, white balance and gamma correction, resolution conversion processing, and image compression processing. The image processing unit 116 also performs the aforementioned refocusing process.

An image memory 117 is used for temporarily storing the digital image signal being subjected to signal processing and for storing the image data that is the signal-processed digital image signal. The image data signal-processed by the digital signal processing unit 113 and the image data stored in the image memory 117 are converted in the recording unit 119 into a data (e.g., a file system data having a hierarchical structure) suitable for the image recording medium 118, and recorded in the image recording medium 118. Instead, the data is subjected to the resolution conversion processing by the digital signal processing unit 113, and subsequently converted by the display unit 121 into a signal (e.g., an NTSC analog signal) suitable for the image display device 120 and displayed on the image display device 120.

Here, the digital signal processing unit 113 may output the digital image signal to the image memory 117 or the recording unit 119 as it is, without image processing according to the control signal from the system control unit 122. Upon a request from the system control unit 122, the digital signal processing unit 113 outputs information on the digital image signal and image data generated in the process of the signal processing to the system control unit 122. For instance, information, such as the spatial frequency of the image, the average value in a designated region and the amount of data of the compressed image or information extracted therefrom is output to the system control unit 122. Upon request from the system control unit 122, the recording unit 119 outputs information, such as the type of the image recording medium 118 and the free space capacity, to the system control unit 122.

A reproduction operation in the case where the image data is stored in the image recording medium 118 will be described.

According to the control signal from the system control unit 122, the recording unit 119 reads the image data from the image recording medium 118. Likewise, according to the control signal from the system control unit 122, in the case where the image data is a compressed image, the digital signal processing unit 113 performs image expansion processing to store the image in the image memory 117. The image data stored in the image memory 117 is subjected to the resolution conversion processing by the digital signal processing unit 113, subsequently converted by the display unit 121 into a signal suitable for the image display device 120 and displayed on the image display device 120.

Figure 2:
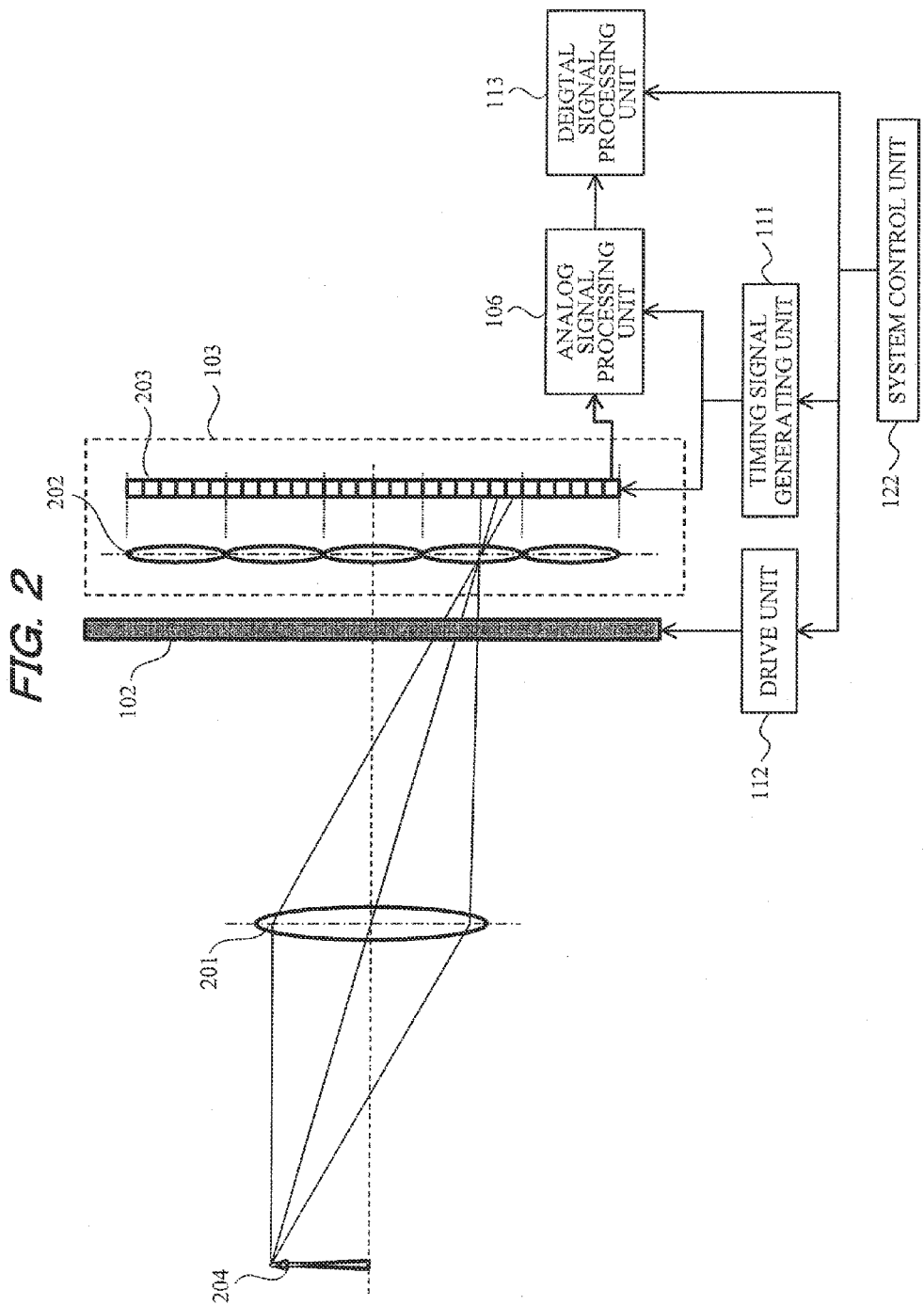
FIG. 2 is a diagram schematically illustrating an image pickup system including an optical system of the image pickup apparatus according to Example 1 of the present invention.

FIG. 2 is a block diagram illustrating an optical system and therearound in the embodiment of the image pickup apparatus according to the present invention.

FIG. 2 illustrates a photographing lens 201, a microlens array 202 arranged between the image pickup element 103 and the photographing lens 201, a sensor array 203 that is a configurational element of the image pickup element 103 in which the aforementioned pixels (photoelectric conversion means) are two-dimensionally arranged, and an object 204. The other configurational elements illustrated in FIG. 2 are identical to those described using FIG. 1. Accordingly, the description thereof is omitted.

An image pickup operation in the example of the image pickup apparatus according to the present invention will hereinafter be described using FIG. 2.

In a state where the mechanical shutter 102 is opened by the drive unit 112, an optical image of the object 204 is formed by the photographing lens 201 on the image pickup element 103. An optical signal incident on the image pickup element 103 is further condensed on each microlens of the microlens array 202, and incident on each pixel of the sensor array 203. The configurations of the microlens array 202 and the sensor array 203 will be described later using FIG. 3. The optical signal incident on the sensor array 203 is photoelectrically converted on each pixel to be outputted as an electric signal. Subsequent processes are identical to those described using FIG. 1.

Figure 3:
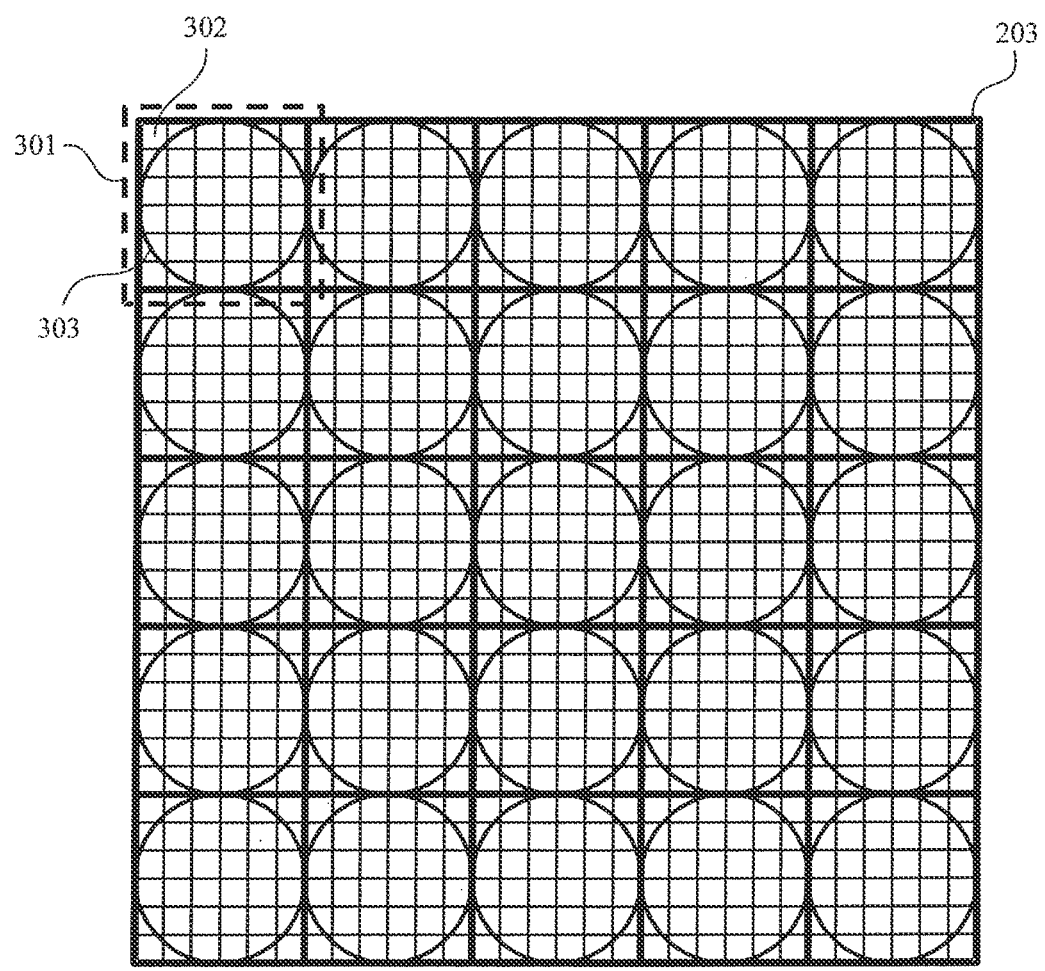
FIG. 3 is a diagram illustrating pixel arrangement of an image pickup element in the image pickup apparatus according to Example 1 of the present invention.

FIG. 3 is an arrangement diagram illustrating the pixel arrangement in the image pickup element of the embodiment of the present invention.

FIG. 3 is a diagram of the image pickup element 103 viewed from the object side. A recording pixel 301 is a unit pixel corresponding to one pixel in a reconstructed image. In this example, the recording pixel 301 includes six rows and six columns of photoelectric conversion means. In this case, each of photoelectric conversion means is called a divided pixel 302. A microlens 303 is arranged at each recording pixel 301. That is, provided that the recording pixel is a pixel block which is a two-dimensionally arranged photoelectric conversion means, each microlens of the microlens array corresponds to a plurality of photoelectric conversion means in one pixel block.

For convenience, in the description of this example, the operation of the image pickup apparatus will be described using the sensor array 203 where five rows and five columns of recording pixels (pixel block) each including 6×6 (prescribed number) divided pixels illustrated in FIG. 3.

Figure 4:
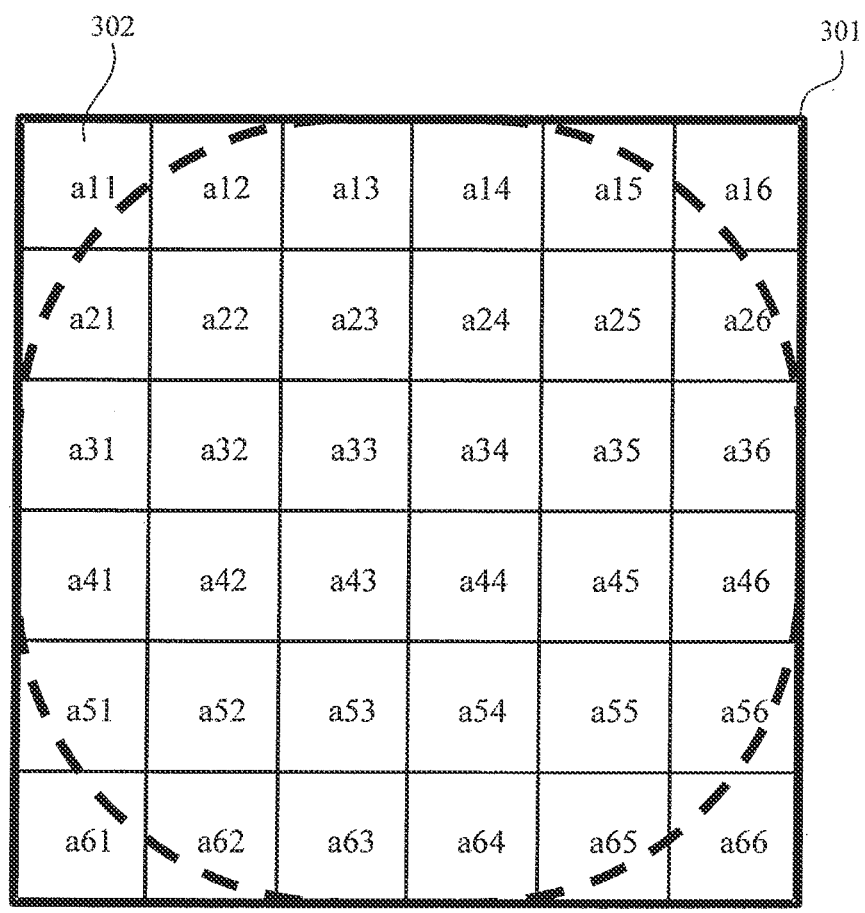
FIG. 4 is an enlarged diagram of recording pixels in the pixel arrangement illustrated in FIG. 3.

FIG. 4 is an enlarged diagram of the recording pixel 301.

As described using FIG. 3, the recording pixel (pixel block) 301 includes pixel arrangement where 6×6 divided pixels 302 are two-dimensionally arranged. For later description, in this example, symbols a11 to a66 are assigned to 36 divided pixels as illustrated in FIG. 4.

Figure 5:
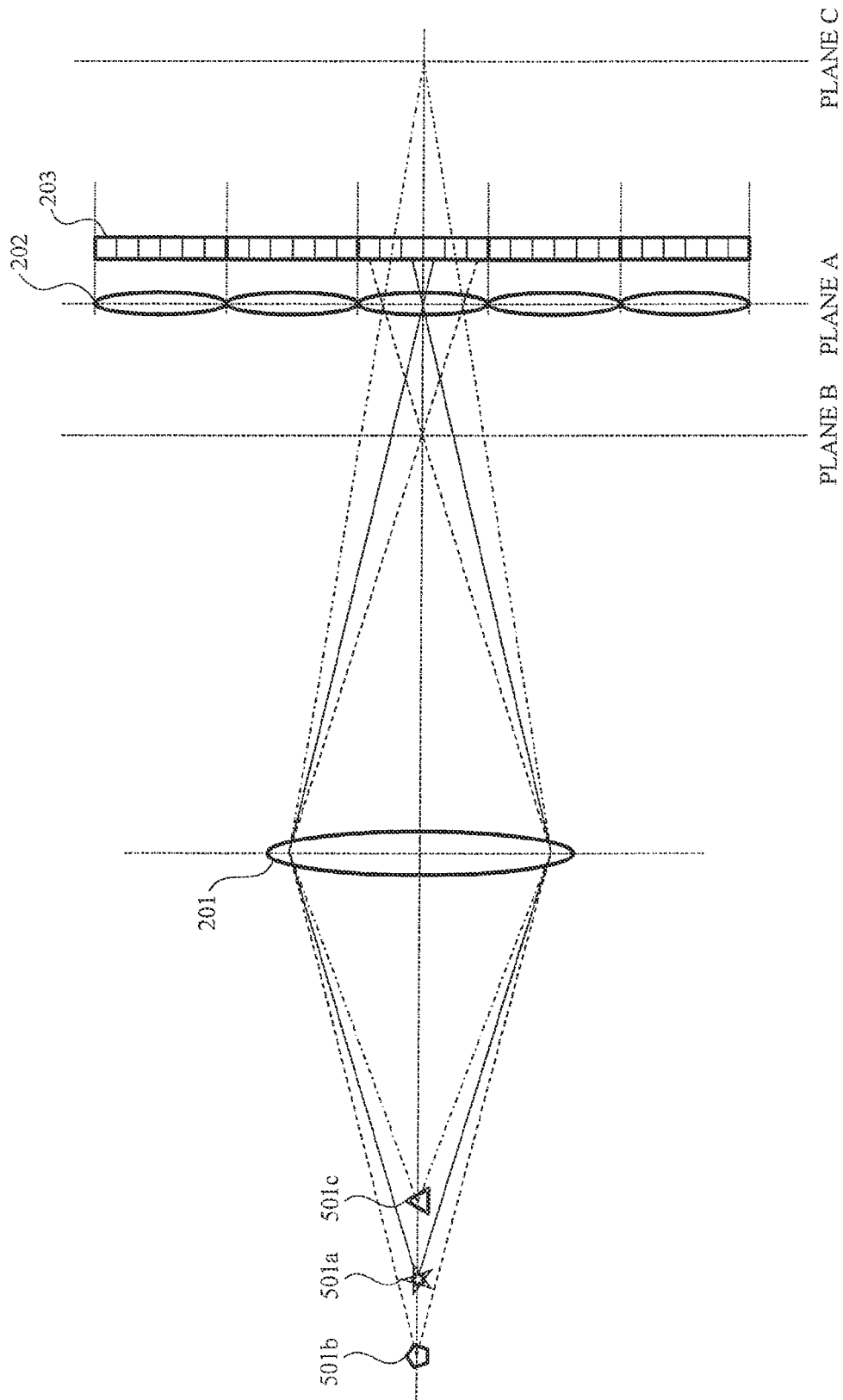
FIG. 5 is a diagram schematically illustrating a trajectory of a light ray from an object in the image pickup system in FIG. 2.

FIG. 5 is a diagram schematically illustrating trajectories of rays incident from objects at various distances onto the image pickup system of the image pickup apparatus according to this example.

An object 501a is disposed at a location where an image thereof is formed by the photographing lens 201 on a plane A including the microlens array 202. Rays passing through the outermost circumference of the photographing lens and through the microlens on the optical axis and being incident on the sensor array 203 among rays from the object 501a are represented by solid lines.

An object 501b is more distant than the object 501a in relation to the photographing lens 201. An image of the object 501b formed by the photographing lens 201 is formed on a plane B nearer the photographing lens than the plane A including the microlens array 202. Rays passing through the outermost circumference of the photographing lens and through the microlens on the optical axis and being incident on the sensor array 203 among rays from the object 501b are represented by broken lines.

An object 501c is nearer than the object 501a in relation to the photographing lens 201. An image of the object 501c formed by the photographing lens 201 is formed on a plane C more distant from the photographing lens than the plane A including the microlens array 202. Rays passing through the outermost circumference of the photographing lens and through the microlens on the optical axis and being incident on the sensor array 203 among rays from the object 501c are represented by alternate long and short dash lines.

As indicated by the trajectory of each ray illustrated in FIG. 5, according to the distance from the photographing lens 201 to the object 501, the divided pixel in the sensor array 203 on which the ray is incident is different. In the basis of this, the image pickup apparatus of this example reconstructs an image from the photographed image signal, thereby allowing images where the focuses are on the objects at various distances, to be generated.

Next, using FIG. 6A to FIG. 10, the difference of operations in the case of the normal photographing and the case of LV driving in the example of the image pickup apparatus according to the present invention will be described.

Figure 6A:
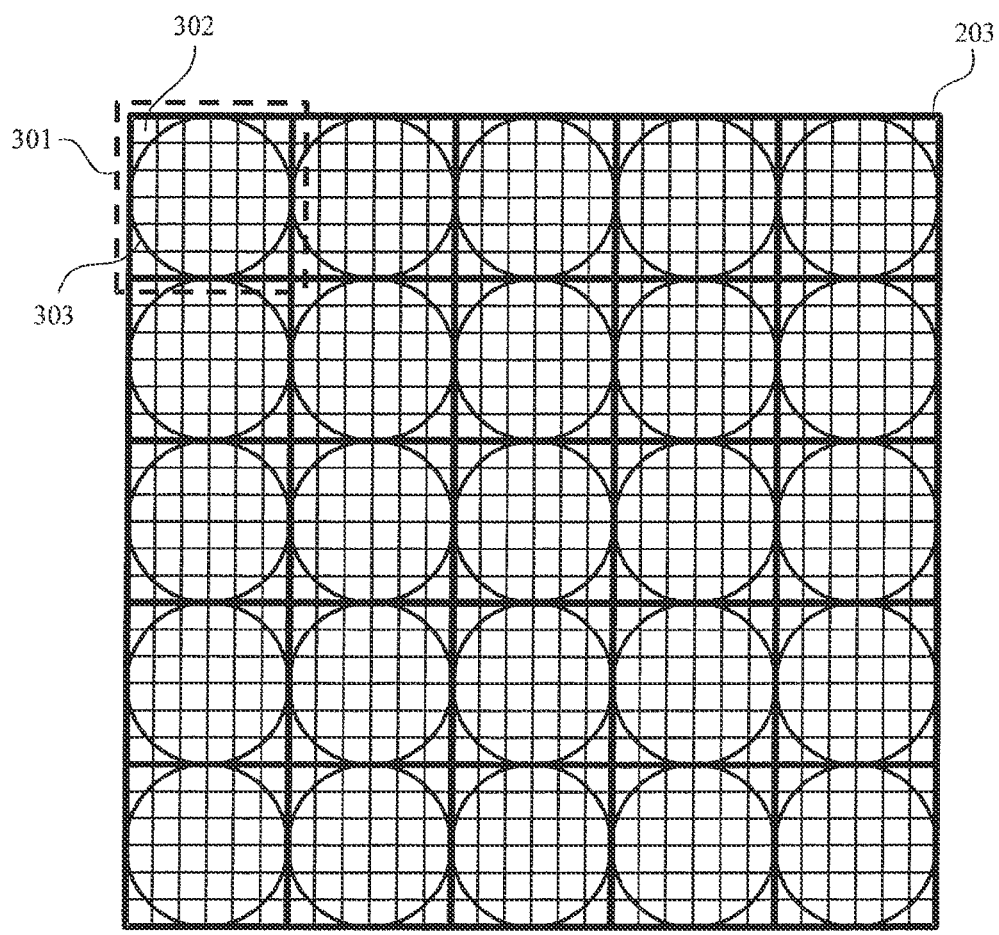
FIGS. 6A and 6B are diagrams illustrating arrangement of pixels used in the case of normal photographing by the image pickup apparatus according to Example 1 of the present invention.
Figure 6B:
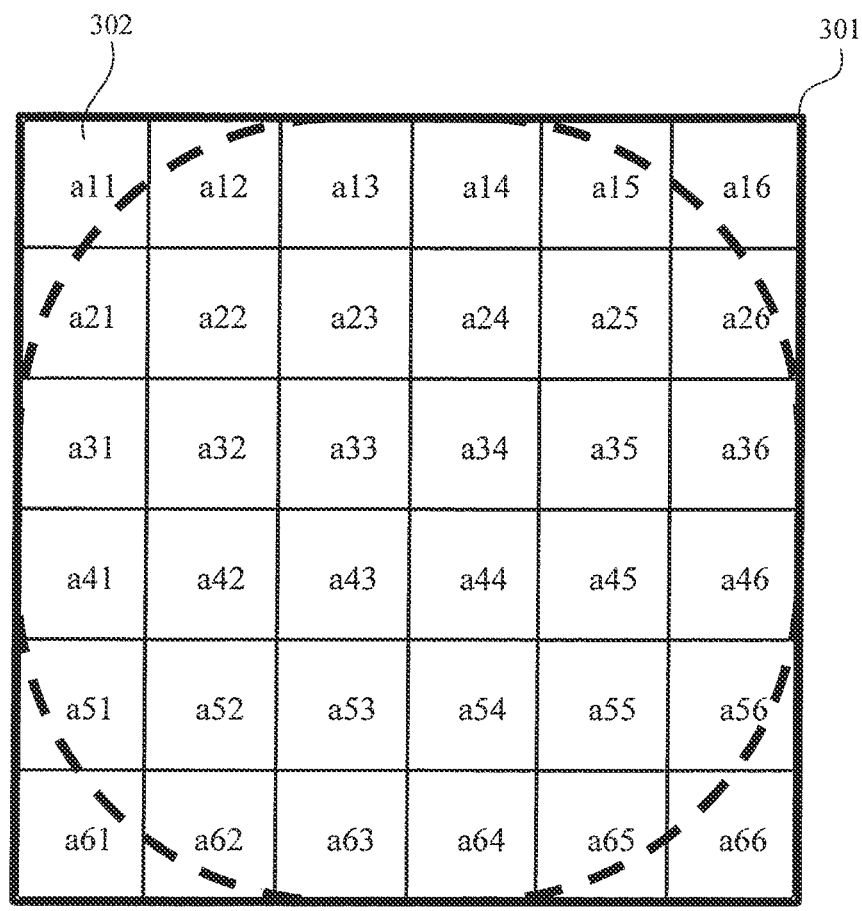

FIGS. 6A and 6B are diagrams illustrating arrangement of pixels used in the case of normal photographing in the image pickup apparatus according to this example. FIG. 6A is a layout diagram of the sensor array 203 described using FIG. 3. FIG. 6B is a diagram illustrating arrangement of the divided pixel 302 in the recording pixel 301, which is a configurational element of the sensor array 203.

In FIGS. 6A and 6B, divided pixels used for normal photographing are shown without color, and unused divided pixels are represented in gray. However, in the case of normal photographing, to allow reconstruction to images with various focal length after reading, signals of all the divided pixels are required to independently read and recorded. Accordingly, in the pixel arrangement diagrams on the pixels used in the case of normal photographing illustrated in FIGS. 6A and 6B, all the divided pixels are shown white.

Figure 7:
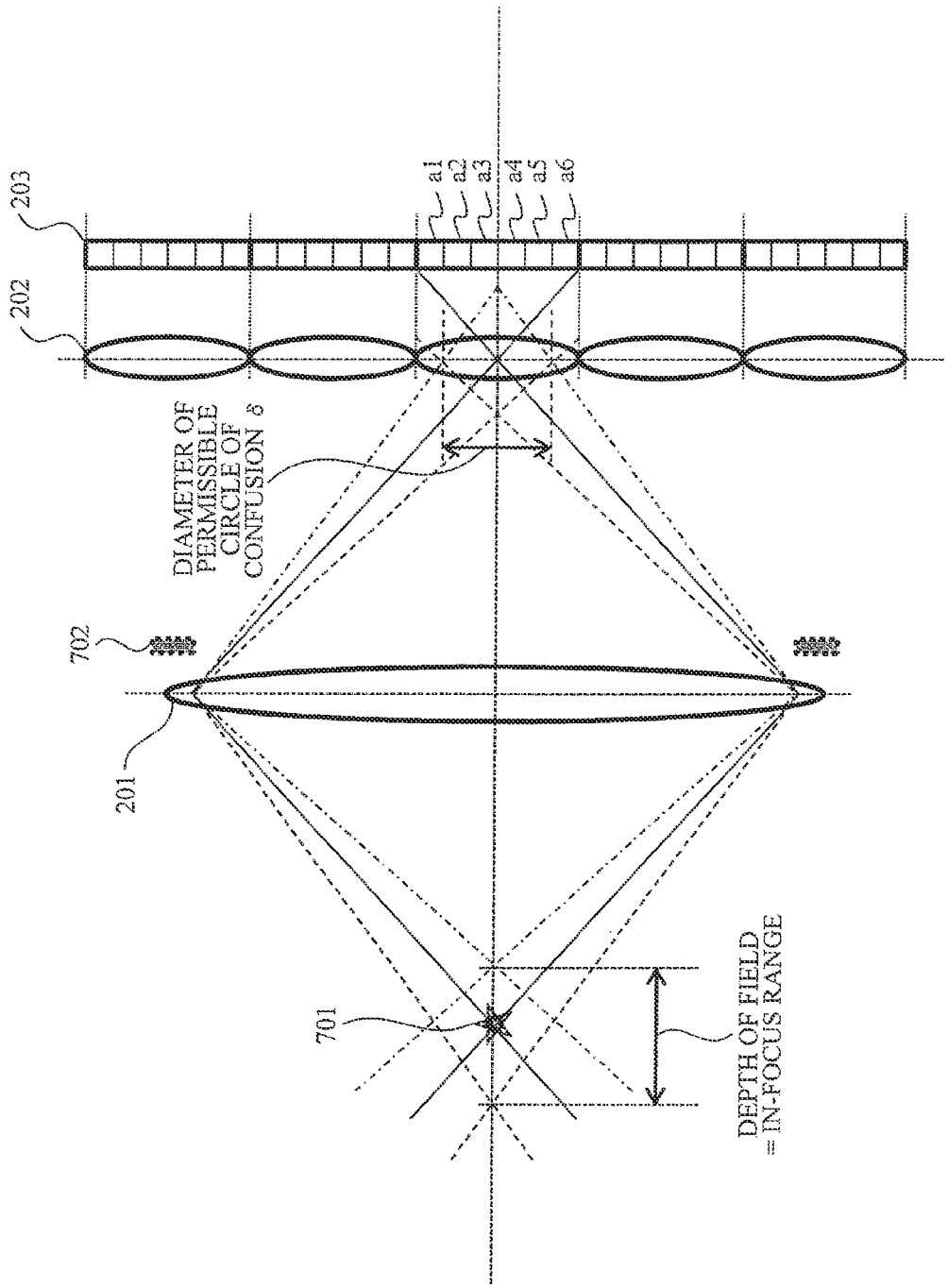
FIG. 7 is a diagram schematically illustrating a focus range in the case of normal photographing by the image pickup apparatus according to Example 1 of the present invention.

FIG. 7 is a diagram schematically illustrating a focus range in the case of normal photographing in the image pickup apparatus according to this example.

FIG. 7 illustrates an object 701, and an aperture 702 that does not actually exist and is schematically represented. In the image pickup apparatus according to this example, arrangement is defined provided that the F number of the photographing lens and the F number of the microlens are identical to each other. In this case, on normal photographing, all the 6×6 divided pixels are used. Thus, the substantially entire region of the diameter of an aperture of the photographing lens 201 is used. Accordingly, this state is equivalent to the open aperture state of the pseudo-aperture 702.

The depth of field d will be calculated according to the following (Equation 1), (Equation 2) and (Equation 3).

$$d = df + dr \quad \text{(Equation 1)}$$

$$df = \frac{\delta \cdot Fno \cdot L^2}{f^2 + \delta \cdot Fno \cdot L} \quad \text{(Equation 2)}$$

$$dr = \frac{\delta \cdot Fno \cdot L^2}{f^2 - \delta \cdot Fno \cdot L} \quad \text{(Equation 3)}$$

Here, df is a front depth of field. dr is the depth of field behind. δ is the diameter of a permissible circle of confusion. Fno is an aperture value. L is an object distance. f is the focal length of the photographing lens. Accordingly, the smaller the aperture value Fno is, the smaller (shallower) the depth of field d becomes. The larger the aperture value Fno is, the larger (deeper) the depth of field d becomes.

Figure 8A:
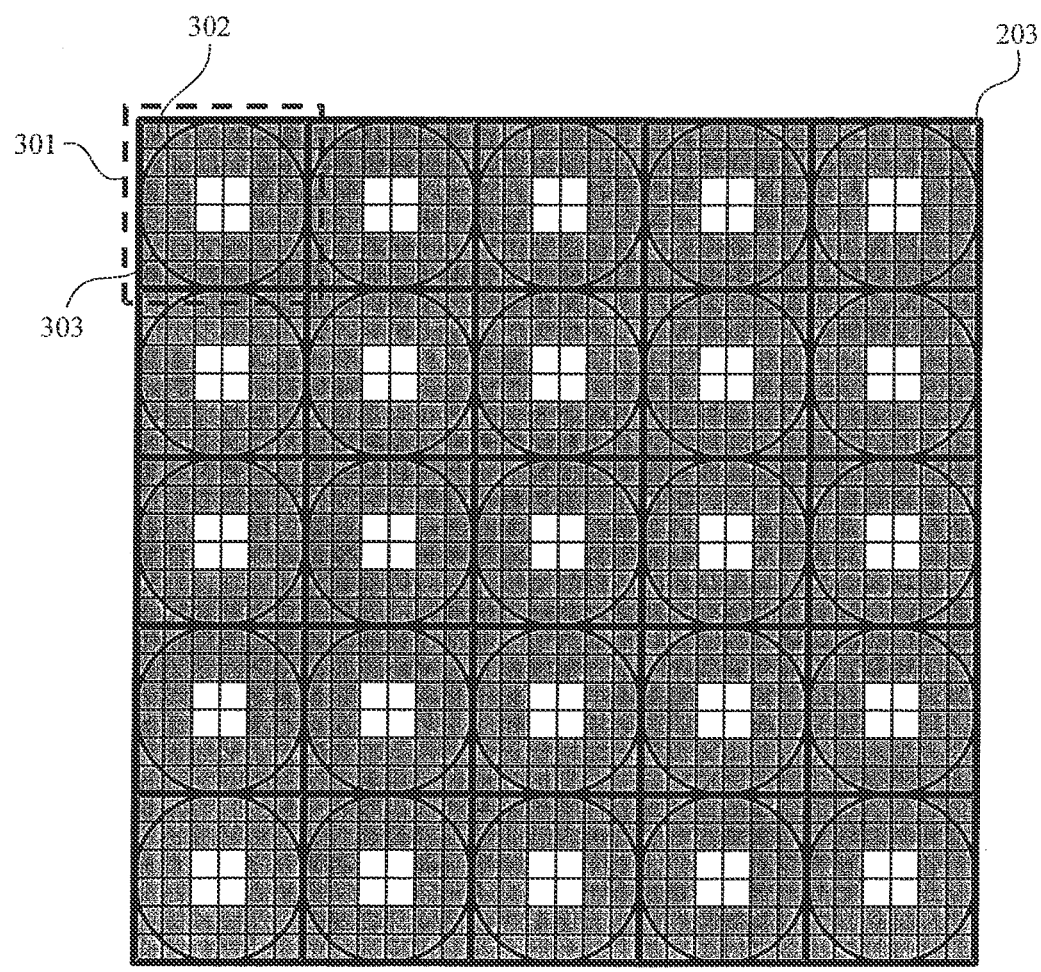
FIGS. 8A and 8B are diagrams illustrating arrangement of pixels used in the case of LV by the image pickup apparatus according to Example 1 of the present invention.
Figure 8B:
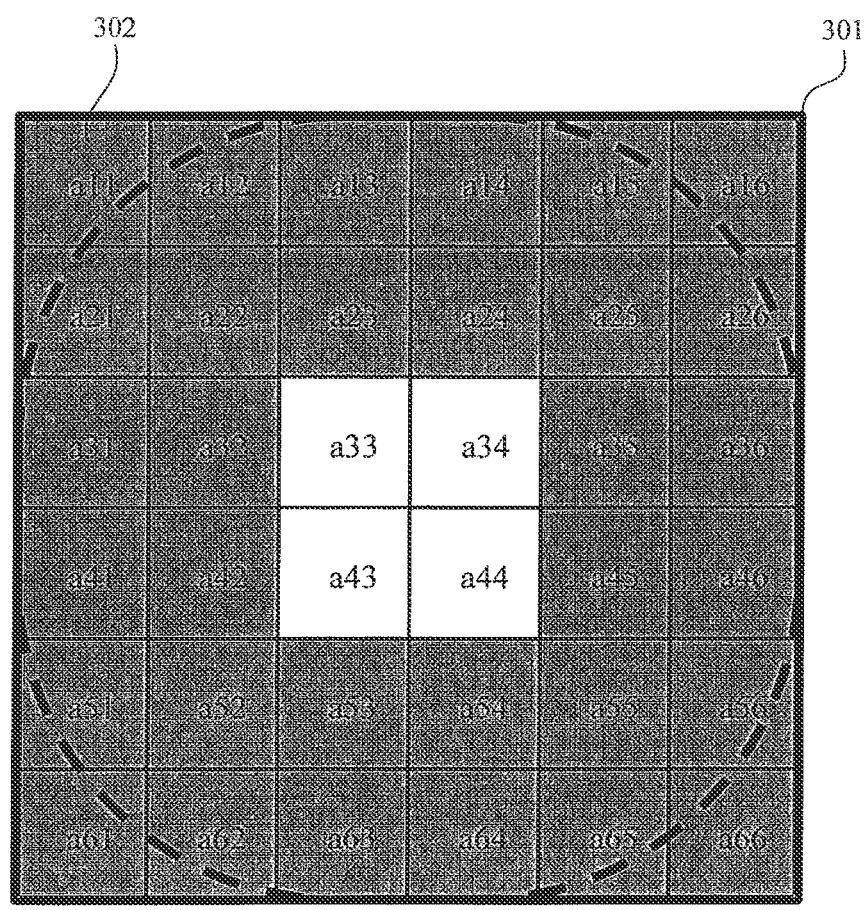

FIGS. 8A and 8B are diagrams illustrating an arrangement of pixels used in the case of LV driving (live view mode) in the image pickup apparatus according to this example. FIG. 8A is a layout diagram of the sensor array 203 described using FIG. 3. FIG. 8B is a diagram illustrating an arrangement of the divided pixels 302 included in the recording pixel 301, which is a configurational element of the sensor array 203. Also in FIGS. 8A and 8B, as with FIGS. 6A and 6B, the used divided pixels are shown white, and the unused divided pixels are represented in gray.

In LV photographing, to clearly display the present composition of the object, it is desirable that the depth of field be large. To attain the frame rate capable of appropriately following a moving object, it is desired that the rate of reading the pixel signal be high. Because of the two reasons described above, in the case of LV driving, the present invention performs driving that reads only a certain number of divided pixels in the pixel block 301 among the divided pixels 302 configuring each recording pixel 301 (pixel block), for instance, pixels around the center.

Accordingly, in FIGS. 8A and 8B illustrating the arrangement of pixels used in the case of LV driving, 2×2 divided pixels around the center of the recording pixel 301 are represented in white, and the other divided pixels are represented in gray.

In this example, the range of the divided pixels selected in the case of LV driving is around the center of the recording pixel 301. However, the present invention is not limited thereto. For instance, in the case of the configuration where the microlens 303 is shifted according to light shading measures in the direction perpendicular to the optical axis of the photographing lens, the range around the center of the recording pixel is not necessarily the selected range. In this case, for instance, a configuration may be adopted, at which the divided pixels are selected around the location on the sensor array at which rays passing through the center of the photographing lens 201 and the center of the microlens 303 arrive.

Figure 9:
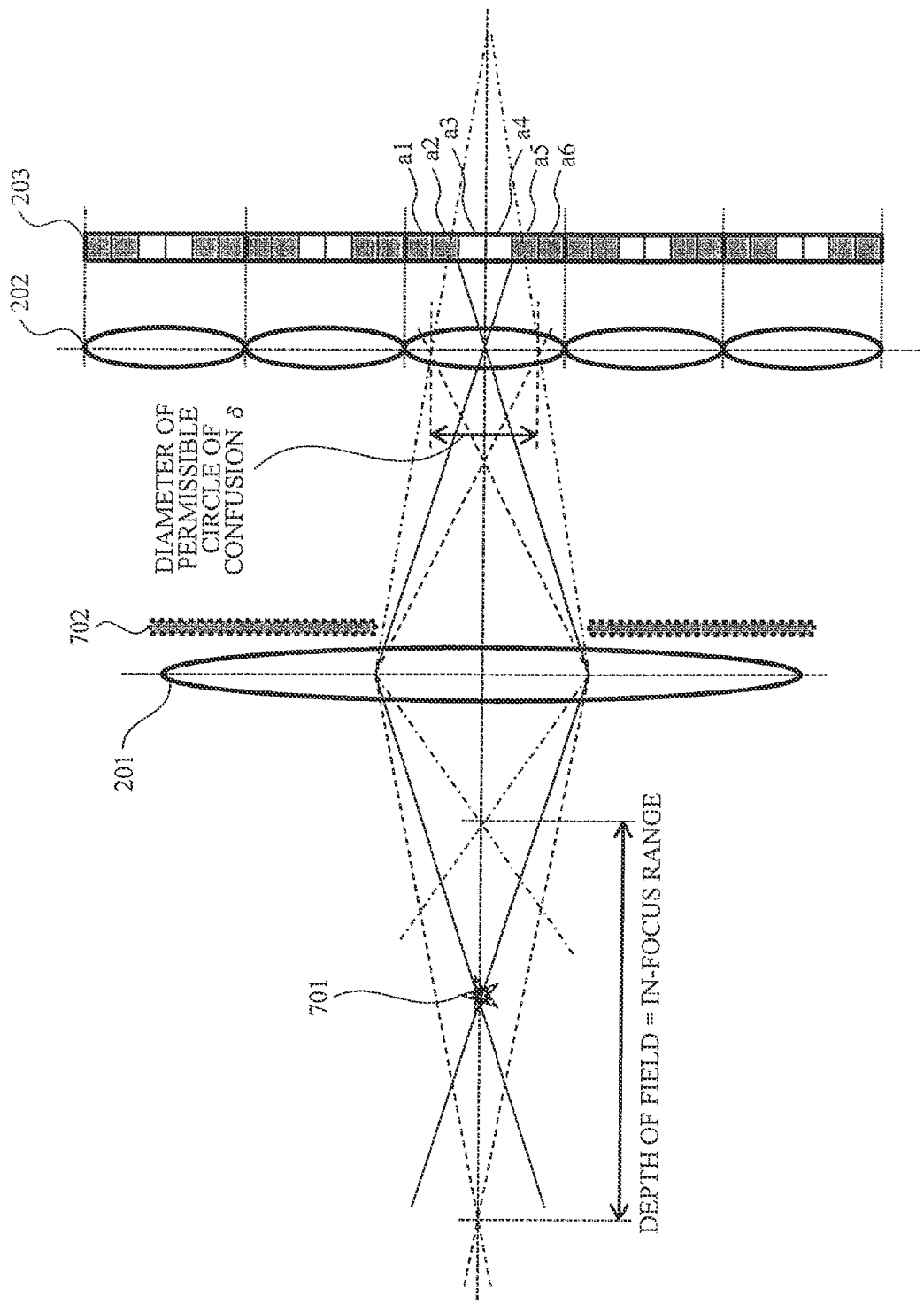
FIG. 9 is a diagram schematically illustrating a focus range in the case of LV by the image pickup apparatus according to Example 1 of the present invention.

FIG. 9 is a diagram schematically illustrating a focus range in the case of LV photographing in the image pickup apparatus according to this example.

In the case of LV photographing, only 2×2 pixels around the center of the recording pixel 301 are used among 6×6 divided pixels. That is, only rays passing though a part on and around the optical axis among rays passing through the photographing lens 201 are used. Accordingly, in the case of LV driving, as illustrated in FIG. 9, the state therein is equivalent to a state where the pseudo-aperture 702 is narrowed. The state in the case of LV driving is a state where the aperture values Fno of (Equation 2) and (Equation 3) are large in comparison with the case of normal photographing described using FIG. 7. Accordingly, the depth of field is larger in the case of live view driving than that in the case of normal photographing, thereby allowing objects in a wider range to be confirmed in real time in a focused state.

Figure 10:
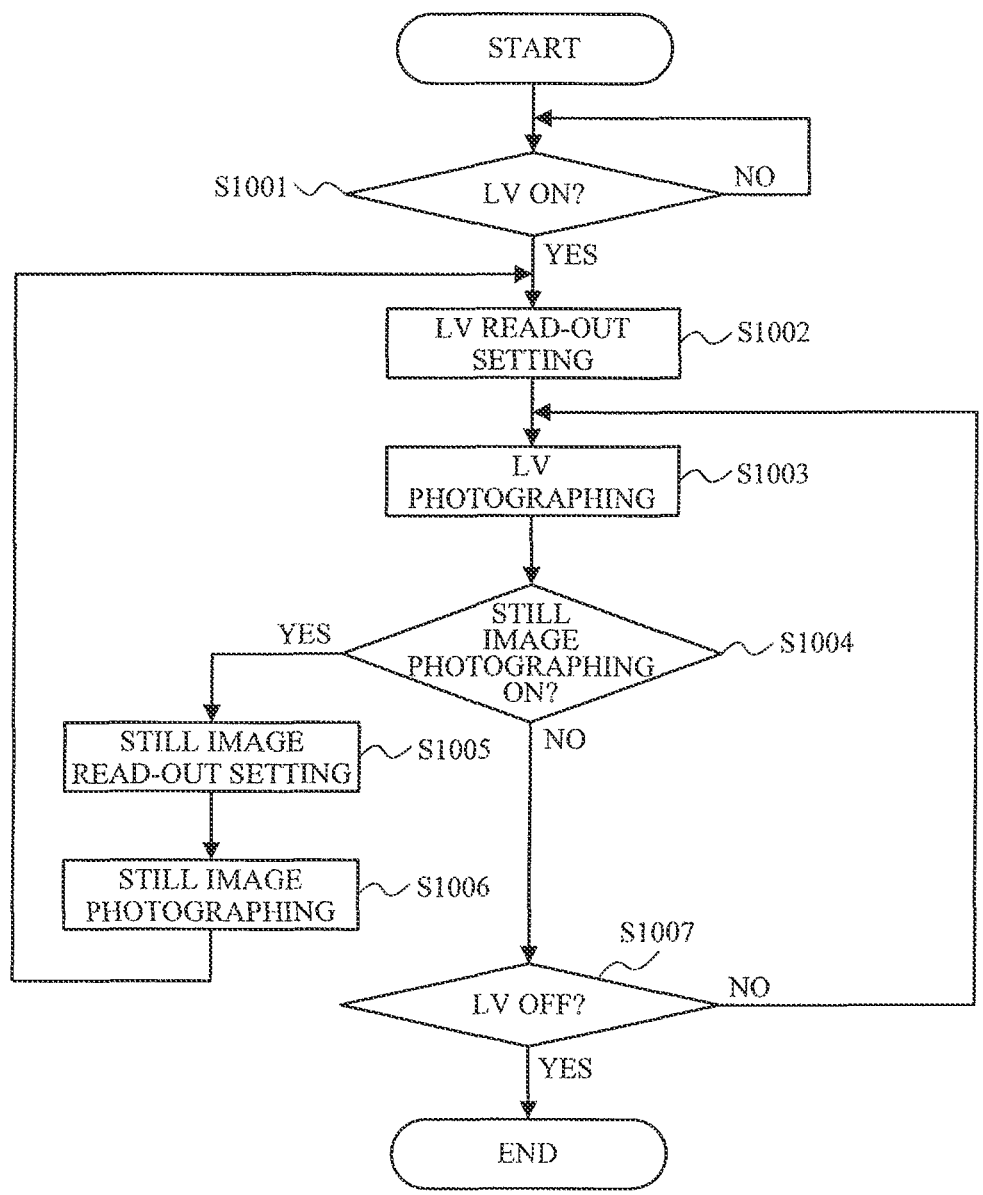
FIG. 10 is a flowchart of a drive switching operation in the image pickup apparatus according to Example 1 of the present invention.

FIG. 10 is a flowchart of a drive switching operation in the image pickup apparatus according to this example.

First, this image pickup apparatus determines whether an LV driving switch is "ON" or not (S1001). If the switch is not "ON", confirmation of the LV driving switch is repeated. If it is determined that the LV driving switch is "ON", only 2×2 divided pixels (a33, a34, a43 and a44) around the center of each recording pixel 301 are set as read-out pixels in the case of LV driving (S1002), and subsequently LV photographing is performed (S1003).

In this state, it is subsequently determined whether a still image photographing switch, such as a release switch, is turned "ON" or not (S1004). If it is determined that the still image photographing switch is turned "ON", all the divided pixels under each microlens are set as read-out pixels in the case of still image photographing (S1005), and subsequently still image photographing is performed (S1006). After completion of the still image photographing, the read-out setting is set back to that in the case of LV driving (S1002) and LV photographing is restarted (S1003).

If it is determined that the still image photographing switch is not "ON", it is subsequently determined whether the LV driving switch is "OFF" or not (S1001). If it is determined that the LV driving switch is not "OFF", the LV photographing is continued (S1003). If it is determined that the switch is "OFF", the series of operations are finished.

Next, the configuration of an arrangement of pixels for selectively reading pixels set in this example will be described using FIG. 11 to FIG. 13. That is, the configuration of the signal read-out unit of the image pickup element in the image pickup apparatus according to this example and a read-out method will be described.

Figure 11:
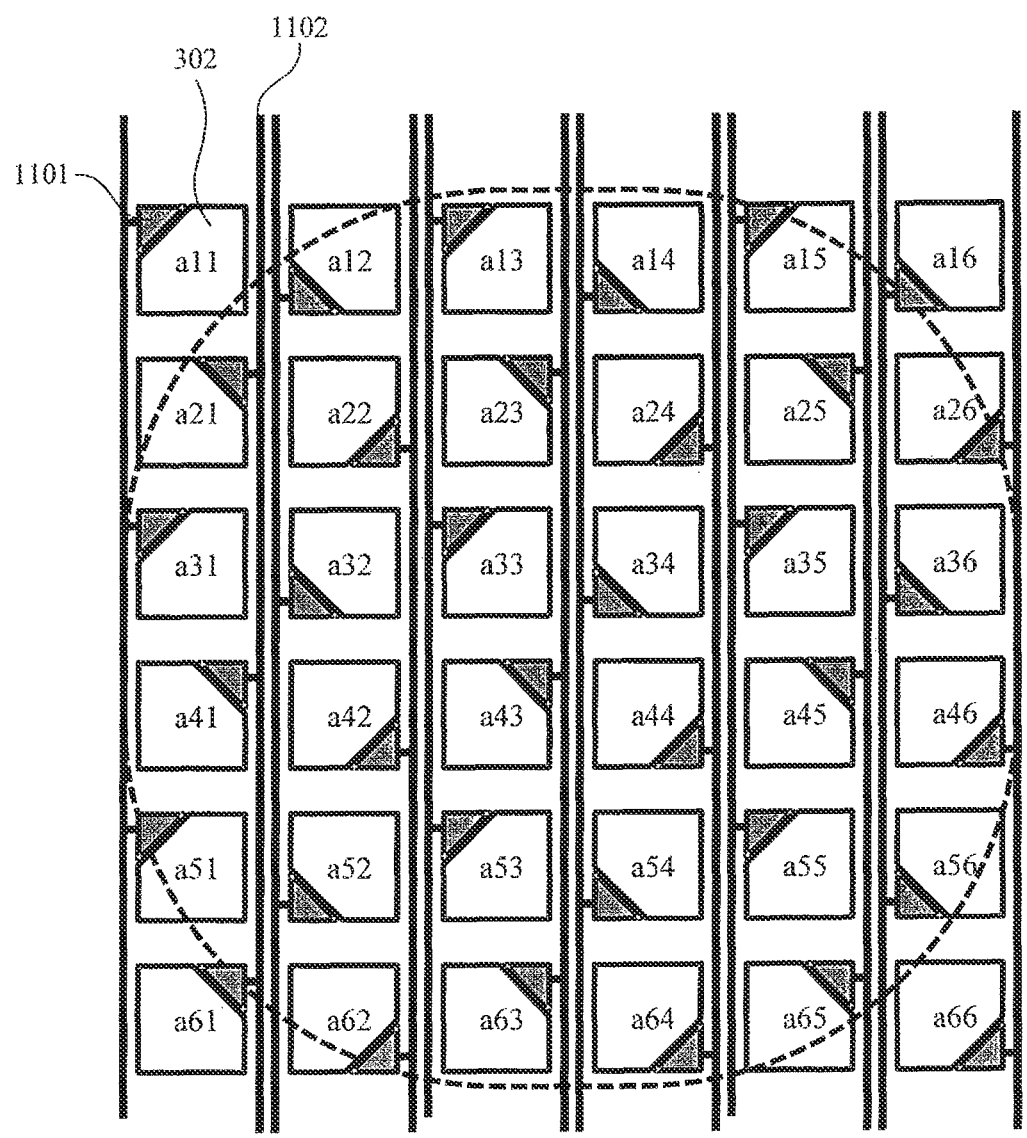
FIG. 11 is a diagram schematically illustrating pixel reading by the image pickup element in the image pickup apparatus according to Example 1 of the present invention.

FIG. 11 is a diagram schematically illustrating the pixel arrangement configuration of the image pickup element in this example.

FIG. 11 illustrates a signal accumulation and read-out unit 1101 that converts charges photoelectrically converted at the divided pixel (photoelectric conversion means) 302 into voltages and outputs it, and a vertical output line 1102 that is a path through which an electric signal output from the signal accumulation and read-out unit 1101 is output. The divided pixels on adjacent columns are commonly and alternately connected to the signal read-out line in a column direction.

The image pickup element of this example illustrated in FIG. 11 has a configuration where one signal accumulation and read-out unit 1101 is connected to one divided pixel 302. More specifically, the electric signal photoelectrically converted from the optical signal incident on the divided pixel 302 is transferred to the signal accumulation and read-out unit 1101 corresponding to each divided pixel and accumulated therein, and subsequently read through the vertical output line 1102.

In the image pickup apparatus in this example, in driving in both the cases of normal photographing and LV driving, the signal from each divided pixel 302 is sequentially and independently accumulated and read.

Figure 12:
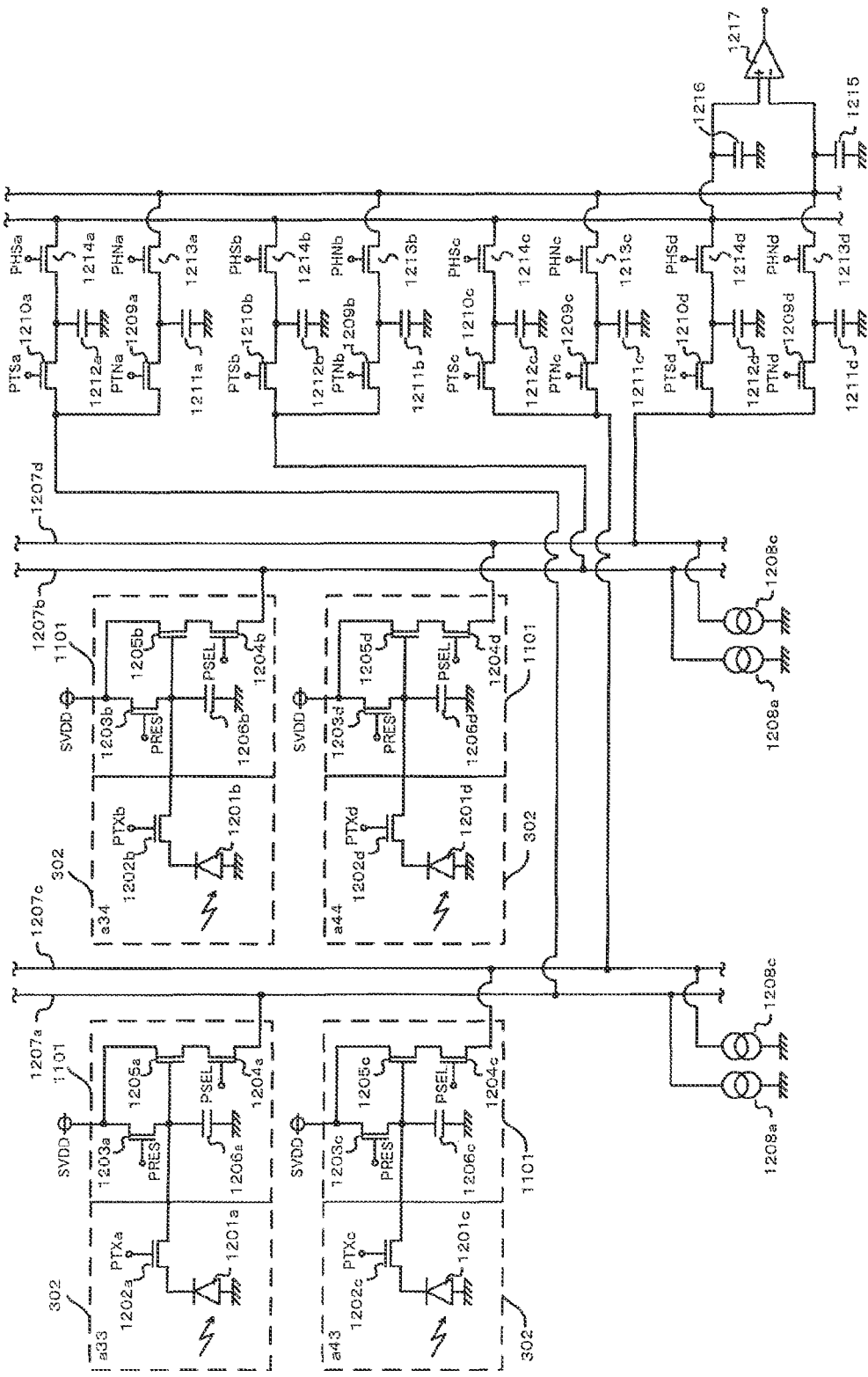
FIG. 12 is a diagram illustrating a configuration of a pixel circuit of the image pickup element having the read-out configuration in FIG. 11.

FIG. 12 is a diagram illustrating a circuit configuration of a CMOS image pickup element including each pixel illustrated in FIG. 11.

The pixel circuit of the CMOS image pickup element in this example illustrated in FIG. 12 has a configuration where one floating diffusion layer FD 1206 is connected to one divided pixel 302.

In FIG. 12, the pixel region in the image pickup element 103 includes the divided pixel 302, and the signal accumulation and read-out unit 1101 arranged one by one for each divided pixel.

The divided pixel 302 includes a photodiode 1201 that is a photoelectric conversion element, and a transfer switch 1202 that transfers charges generated by the photoelectric conversion by the photodiode 1201, in accordance with pulses PTX.

The signal accumulation and read-out unit 1101 includes the floating diffusion layer FD 1206 that stores charges transferred by each transfer switch 1202 of each divided pixel 302, and a reset switch 1203 that resets the floating diffusion layer FD 1206 connected to the gate of a pixel amplifier 1205 to the level of a potential SVDD in accordance with reset pulses PRES. The unit further includes the pixel amplifier 1205 that amplifies charges accumulated in the floating diffusion layer FD 1206 as a source follower, and a row selection switch 1204 that selects the pixels in the row direction selected by a vertical scanning circuit, not illustrated, are selected according to selection pulses PSEL.

In the configuration of the pixel circuit illustrated in FIG. 12, the transfer switches 1202a, 1202b, 1202c and 1202d are controlled to thereby allow charges photoelectrically converted by photodiodes 1201a, 1201b, 1201c and 1201d to be transferred to the respective floating diffusion layer FDs 1206a, 1206b, 1206c and 1206d.

The charges in the pixels in each row selected by the row selection switch 1204 are output through a vertical output line 1207 to a load current source 1208 by means of the source follower. A signal output pulse PTS turns on the transfer gate 1210, thereby accumulating charges in a transfer capacitor CTS 1212. A noise output pulse PTN turns on a transfer gate 1209, thereby accumulating charges in a transfer capacitor CTN 1211. Subsequently, a noise component is output through transfer switches 1213 and 1214 to a capacitor CHN 1215 in accordance with control signals PHS and PHN from a horizontal scanning circuit, not illustrated, and a signal component is accumulated in a capacitor CHS 1216. A difference between both the components is output as a pixel signal via a differential amplifier 1217.

Figure 13:
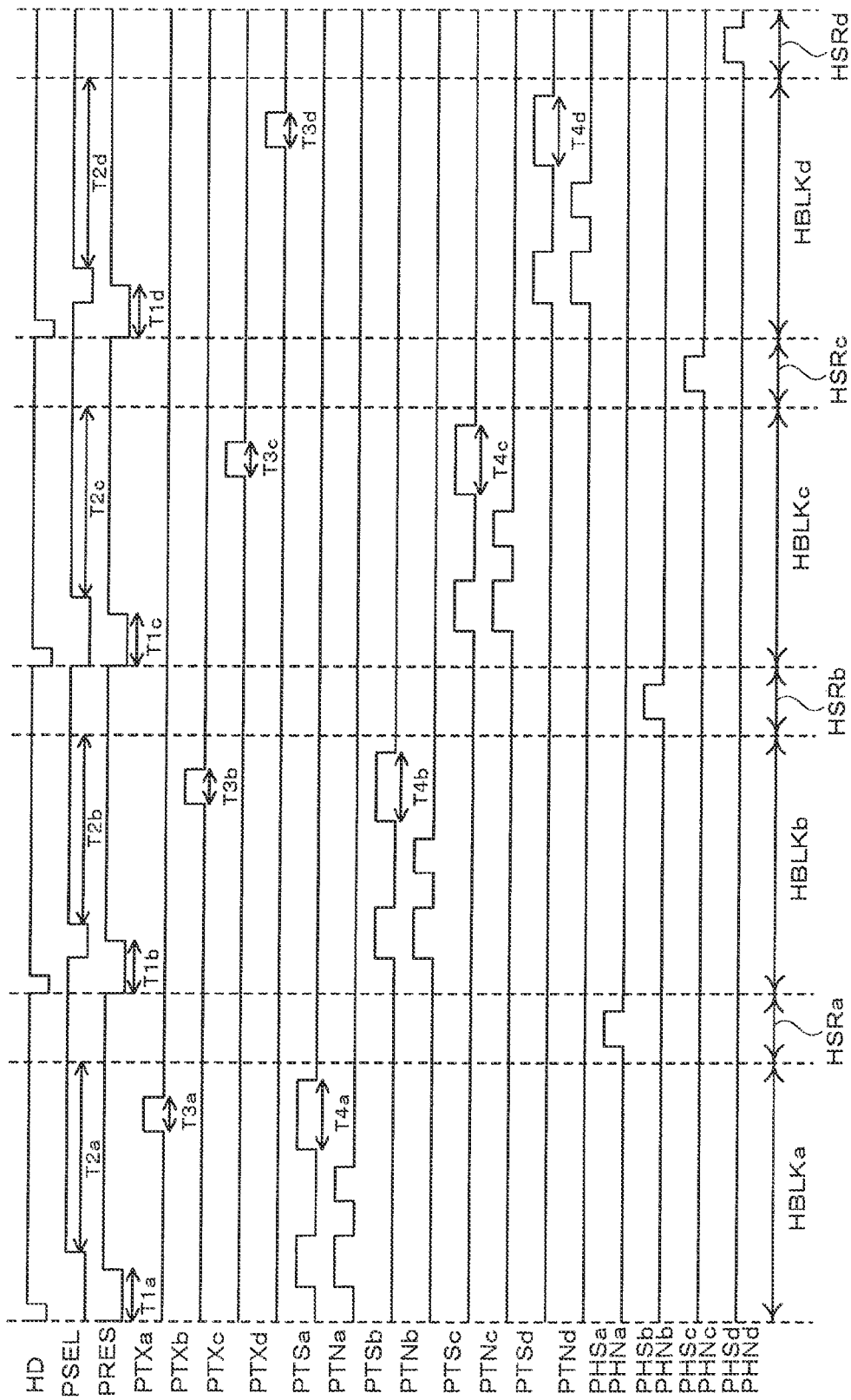
FIG. 13 is a drive timing chart of the image pickup element illustrated in FIG. 12.

FIG. 13 is a timing chart illustrating drive timing of the image pickup element according to this example. Each signal illustrated in the timing chart is generated by the timing signal generating unit 111 according to control by the system control unit 122 and supplied.

The drive timing illustrated in FIG. 13 is for independently reading output signals of the respective divided pixels 302 in the pixel circuit illustrated in FIG. 12. In normal photographing, signal reading according to the drive timing allows the output signal of the divided pixel to be used as a signal that may be reconstructed as images with various focal lengths in the digital signal processing circuit 113. In LV photographing, the read output signals from the divided pixels are added in the digital signal processing circuit 113, and can be used as an LV display signal suitable for confirmation of framing.

For instance, the driving illustrated in the timing chart of FIG. 13 sequentially reads the divided pixel a33, a34, a43 and a44 in this order.

First, in a time period of HBLKa+HSRa, a signal of the divided pixel a33 is read. As a signal HD indicating start of one horizontal scanning time period falls, the vertical output line 1207 is reset to the constant potential by a circuit, not illustrated. Subsequently, the PRES signal turns on a MOS transistor 1203a, thereby allowing charges accumulated in the floating capacitor 1206a provided at the gate of a MOS transistor 1205a to be reset to a constant potential SVDD in a time period T1a.

Subsequently, the PRES signal is set to a high level, the MOS transistor 1203a is turned OFF, and subsequently, a PSEL signal is set to a high level. Accordingly, the source follower circuit including the MOS transistor 1205a and the load current source 1208a becomes in an operating state, and noise is output to the vertical output line 1207a corresponding to a floating gate reset potential of the MOS transistor 1205a. A PTNa signal is set to the high level in a time period during which PSEL is high, thereby allowing an accumulation capacitor CTN 1211a accumulating the noise component to be connected to the vertical output line 1207a. The accumulation capacitor CTN 1211a holds a signal of the noise component.

What is subsequently performed is accumulation of a mixed signal of photocharges generated in the photoelectric conversion element and the noise component. First, the vertical output line 1207 is reset to a constant potential by a circuit, not illustrated. Subsequently, a PTXa signal is set to a high level. The transfer MOS transistor 1202a is turned on, thereby allowing the photocharges accumulated in the photoelectric conversion element 1201a to be transferred to the floating gate of the MOS transistor 1205a in a time period T3a. At this time, the PSEL signal is maintained at the high level. Accordingly, the source follower circuit is becomes an operating state. The "optical signal+noise signal" is output to the vertical output line 1207a corresponding to the potential of the floating gate of the MOS transistor 1205a. In a time period T4a including the time period T3a, the PTSa signal is set to the high level. Accordingly, an accumulation capacitor CTS 1212a is connected to the vertical output line 1207a, and a signal of the photocharge component+the noise component is held in the accumulation capacitor CTS 1212a.

As described above, the noise component of one line and the optical signal generated in the photodiode+the noise component are accumulated in the CTN 1211a and CTS 1212a, respectively.

Next, in a time period HSRa, arrangement of the two signals are transferred according to control pulses PHSa and PHNa controlled by a horizontal shift register, not illustrated, to the capacitors CHN 1215 and CHS 1216, respectively. The noise component and the optical signal+the noise component accumulated in the respective capacitors CHN 1215 and CHS 1216 are output by the differential amplifier 1217 as a difference between (the optical signal+the noise component) and the noise component, i.e., the optical signal.

Subsequently, in a time period of HBLKb+HSRb, control signals PTXb, PRES and PSEL are controlled, thereby reading the signal of the divided pixel a34. The timing of reading the signal of the divided pixel a34 is similar to the aforementioned timing of reading the signal of the divided pixel a33. Accordingly, the description thereof is omitted.

Likewise, in a time period of HBLKc+HSRc, the control signals PTXc, PRES and PSEL are controlled, thereby reading the signal of the divided pixel a43. In a time period of HBLKd+HSRd, control signals PTXd, PRES and PSEL are controlled, thereby reading the signal of the divided pixel a44. Thus, signal reading of the four divided pixels a33, a34, a43 and a44 arranged in 2×2 around the center of the recording pixel 301 is completed. The read signals of the four divided pixels are added by the image processing unit 116 to generate a pixel signal for the LV display image.

It has been described that, according to the drive timing of the pixel circuit of this example described using FIG. 13, the output signals from the four divided pixels are sequentially read. However, the present invention is not limited thereto. For instance, drive timing may be adopted, at which, up to transfer of the signals to the respective capacitors CTN 1211 and CTS 1212 (time period of HBLKa to d in FIG. 13), reading is sequentially performed, and, after the signals of the four divided pixels are aligned in the capacitors CTN 1211 and CTS 1212, horizontal transfer is performed therealong (time period of HSRa to d in FIG. 13).

According to the aforementioned Example 1 of the present invention, in the image pickup apparatus where each of the microlenses are arranged so as to correspond to the plurality of photoelectric conversion means of the image pickup element, an image with a large depth of field can be displayed at a high frame rate in the LV operation.

Example 2

Next, Example 2 of the present invention will be described. Example 2 of the present invention is characterized in the pixel configuration of an image pickup element and a read-out method of each divided pixel. The configuration of the image pickup apparatus is similar to that of Example 1 described using FIGS. 1 to 10. Accordingly, the description thereof is omitted.

Figure 14:
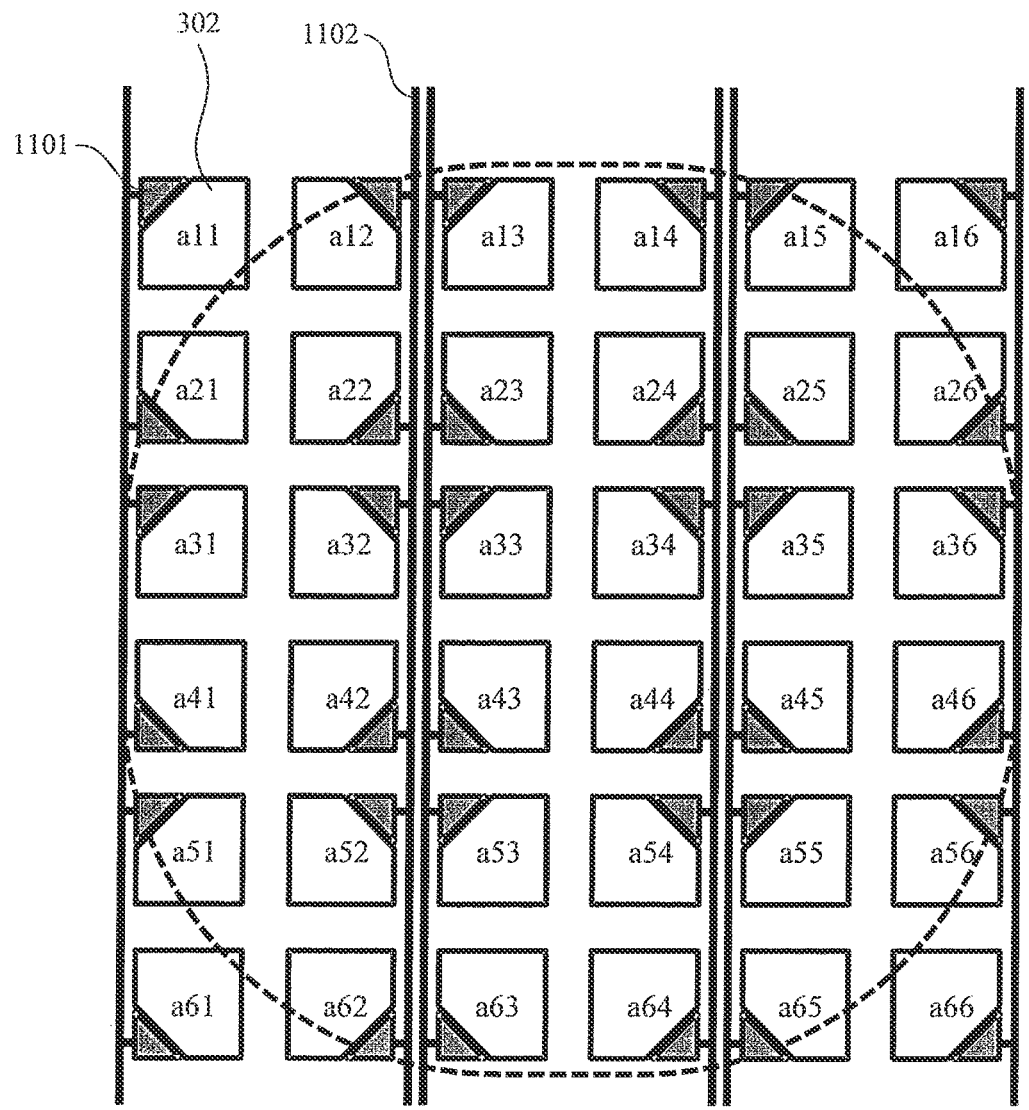
FIG. 14 is a diagram schematically illustrating a pixel reading configuration of the image pickup element of the image pickup apparatus according to Example 2 of the present invention.

FIG. 14 is a diagram schematically illustrating a configuration of an arrangement of pixels in an image pickup element according to Example 2 of the present invention. The pixel configuration of the image pickup element according to Example 2 of the present invention illustrated in FIG. 14 is different from the pixel configuration of the image pickup element in Example 1 described using FIG. 11 in the following points. That is, in this example, each vertical output line 1102 is shared by vertically adjacent two divided pixels 302, thereby reducing by half the number of vertical output lines 1102 and the number of pixel circuits in the column direction connected to the vertical output lines.

Figure 15:
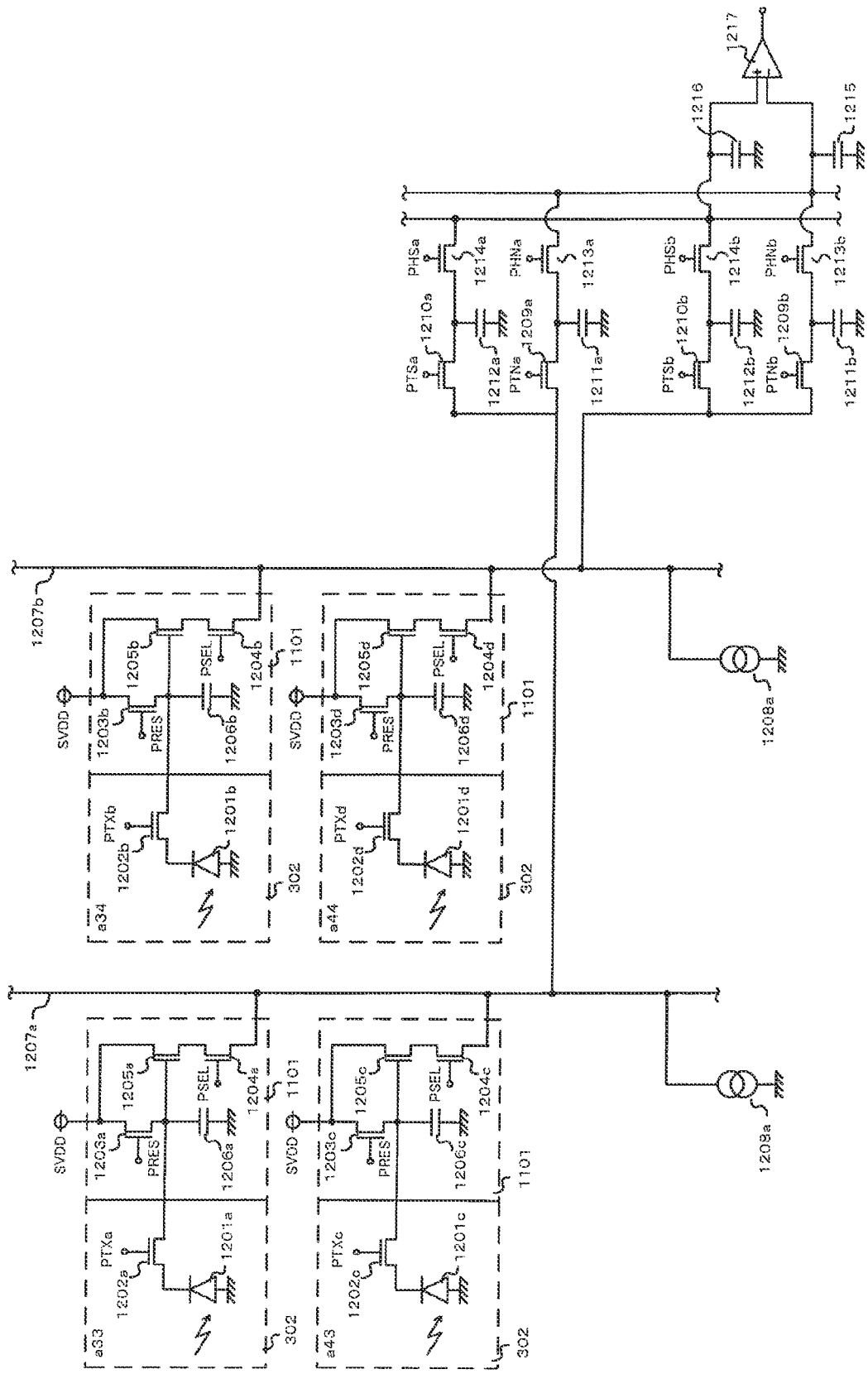
FIG. 15 is a diagram illustrating a configuration of the pixel circuit of the image pickup element including the read-out configuration in FIG. 14.

FIG. 15 is a diagram illustrating a circuit configuration of a CMOS image pickup element in this example.

The pixel circuit of the CMOS image pickup element of this example illustrated in FIG. 15 also has a configuration where one floating diffusion layer FD 1206 is connected to one divided pixel 302. The configuration up to the divided pixel 302 and accumulation and read-out unit 1101 is similar to the pixel circuit configuration of the image pickup element according to Example 1 of the present invention illustrated in FIG. 12.

In this example, both a signal from the divided pixel a33 and a signal from the divided pixel a43 are output to the vertical output line 1207*a* and subsequently transferred to a column circuit. Both the signal from the divided pixel a34 and the signal from the divided pixel a44 are output to the vertical output line 1207*b* and transferred to the subsequent column circuit.

The drive timing of the image pickup apparatus in this example is similar to the drive timing of the image pickup apparatus according to Example 1 of the present invention illustrated in FIG. 13. Accordingly, the description thereof is herein omitted.

Example 3

Next, Example 3 of the present invention will be described using FIGS. 16 and 17. The pixel circuit configuration of the image pickup element according to Example 3 of the present invention is similar to the pixel circuit configuration of the image pickup element according to Example 1 illustrated in FIG. 12.

Figure 16:
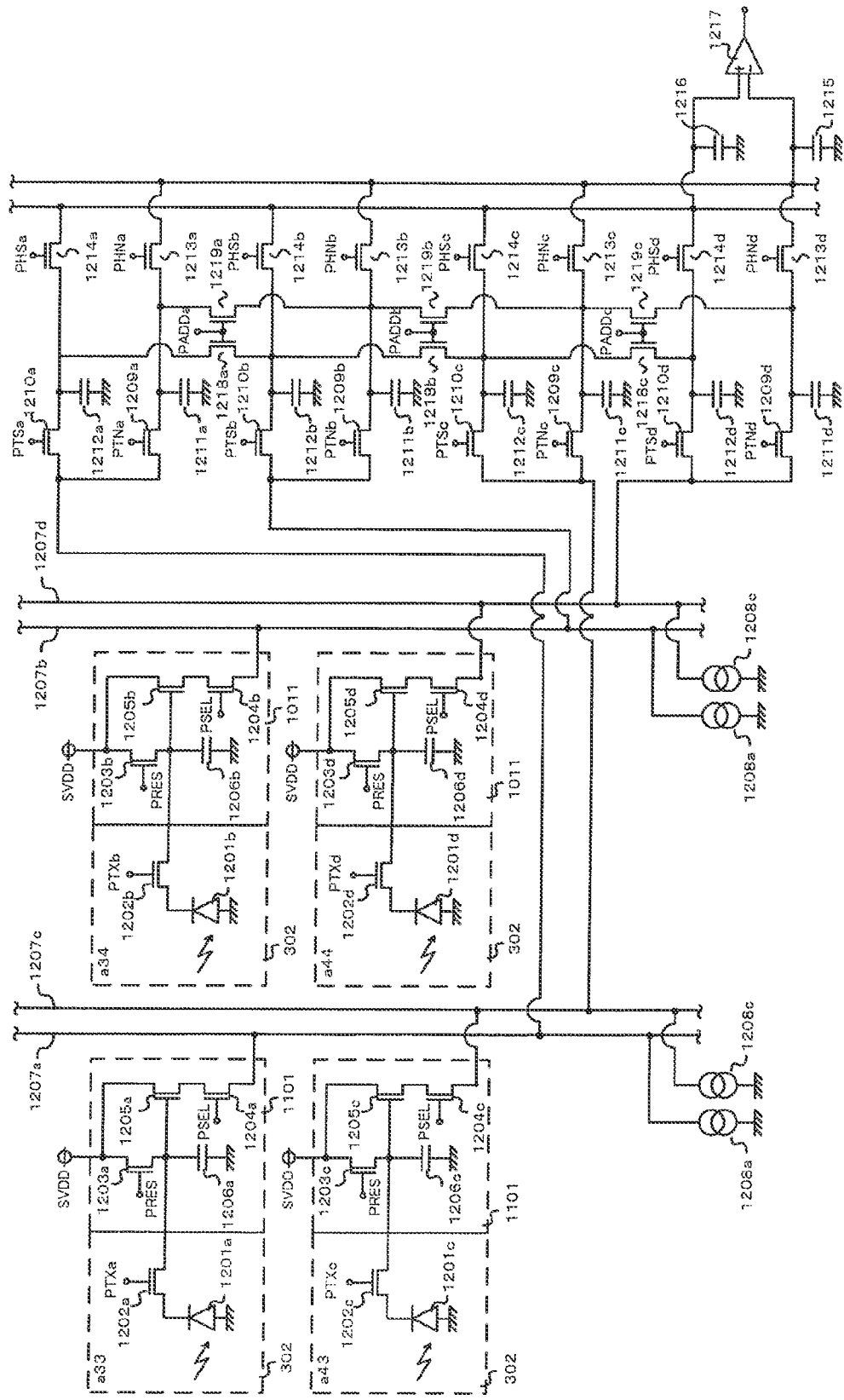
FIG. 16 is a diagram illustrating a configuration of the pixel circuit of the image pickup element according to Example 3 of the present invention.

FIG. 16 is a diagram illustrating a circuit configuration of a CMOS image pickup element according to this example. The pixel circuit configuration of the image pickup element of this example is different from the pixel circuit configuration of the image pickup element of Example 2 illustrated in FIG. 15 in the following points. That is, a switch 1218 connected with the capacitor CTN 1211 of each column circuit and a switch 1219 connected with the capacitor CTS 1212 of each column circuit are added in this example. These switches 1218 and 1219 are turned on by setting a PADD signal to a high level, thereby attaining the connection.

Figure 17:
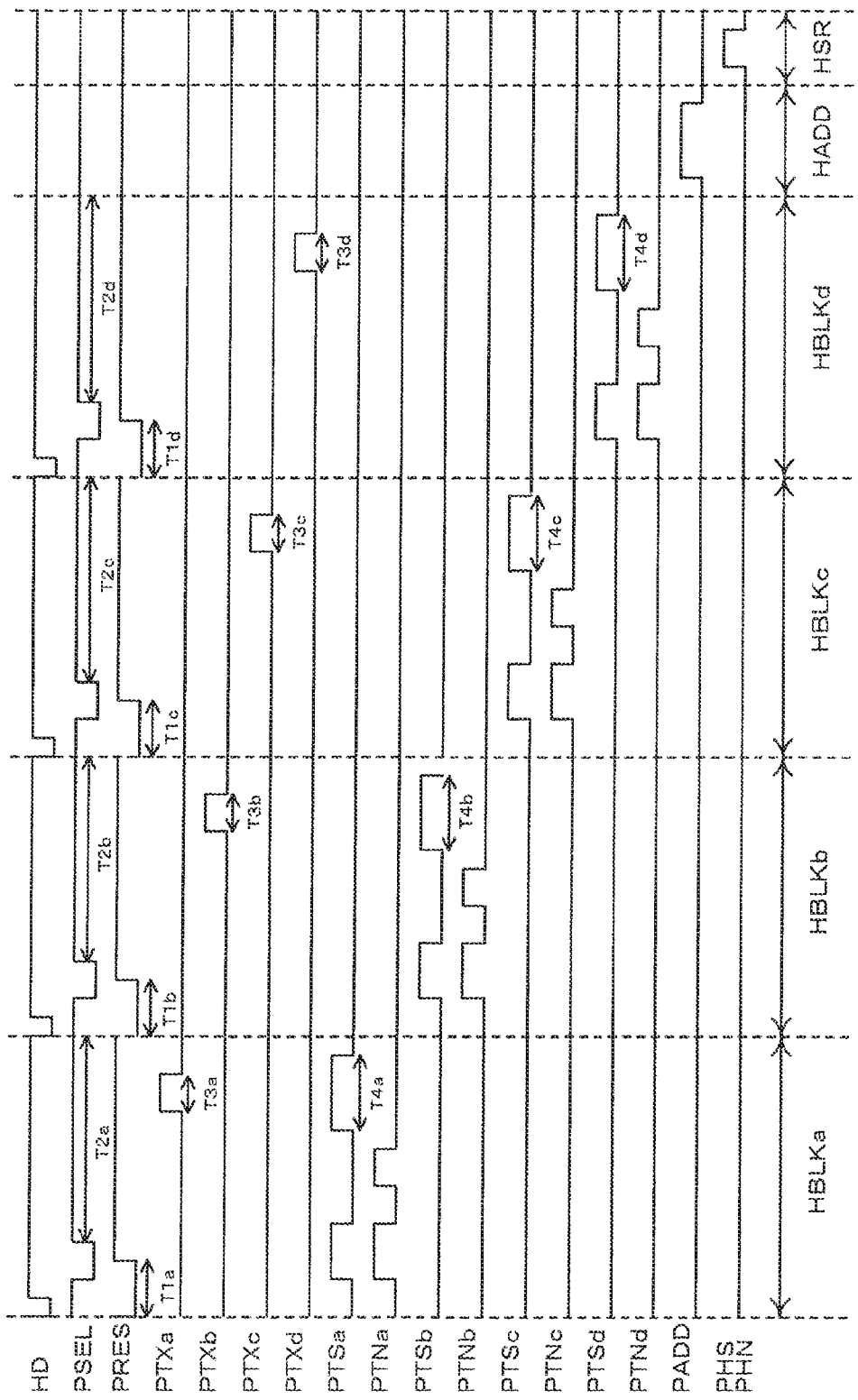
FIG. 17 is a drive timing chart of the image pickup element illustrated in FIG. 16.

FIG. 17 is a timing chart illustrating drive timing of the image pickup element according to this example in the case of LV driving. The drive timing of the image pickup element according to this example in the case of normal photographing is similar to the drive timing of the image pickup apparatus according to Example 1 of the present invention illustrated in FIG. 13. Accordingly, the description thereof is herein omitted.

The drive timing illustrated in FIG. 17 is drive timing in the case of LV driving, at which a part of the signal of each divided pixel 302 illustrated in FIG. 12 is integrally read as a pixel output signal. The signal reading according to this drive timing results in high speed reading, while not allowing reconstruction to images with various focal lengths.

In the drive timing illustrated in FIG. 17, a time by which the accumulation capacitors CTN 1211*a* to 1211*d* and the accumulation capacitors CTS 1212*a* to 1212*d* hold a noise component and a signal of a photocharge component+the noise component sequentially on a four divided pixel basis (time period HBLKa to d in FIG. 17) is similar to that in the drive timing in the case of normal photographing illustrated in FIG. 13.

Subsequently, arithmetic average processing of the signals accumulated in the accumulation capacitor CTN 1211 and the accumulation capacitor CTS 1212 is performed. In a time period HADD, signals PADDa to PADDc are set to high levels, thereby turning on all the switches 1218*a* to 1218*c* and 1219*a* to 1219*c*. Accordingly, signals accumulated in capacitors CTNa, CTNb, CTNc and CTNd are arithmetically averaged. At the same time, signals accumulated in capacitors CTSa, CTSb, CTSc and CTSd are also arithmetically averaged. Subsequently, the signal PADD is set to the low level, thereby turning off all the switches 1218 and 1219. Accordingly, the connection between the capacitors CTN and the connection between the capacitors CTS are opened.

Next, in a time period HSR, the arrangement of the two signals are transferred to the CHN 1215 and the CHS 1216 according to control pulses PHS and PHN controlled by a horizontal shift register, not illustrated. The noise component and the optical signal+noise component accumulated in the capacitors CHN 1215 and CHS 1216 are output as the difference, i.e. an optical signal, between (the optical signal+the noise component) and the noise component by the differential amplifier 1217. Thus, reading of the arithmetically-averaged signal of the 2×2-arranged four divided pixels a33, a34, a43 and a44 is completed.

Example 4

Next, Example 4 of the present invention will be described.

Figure 18:
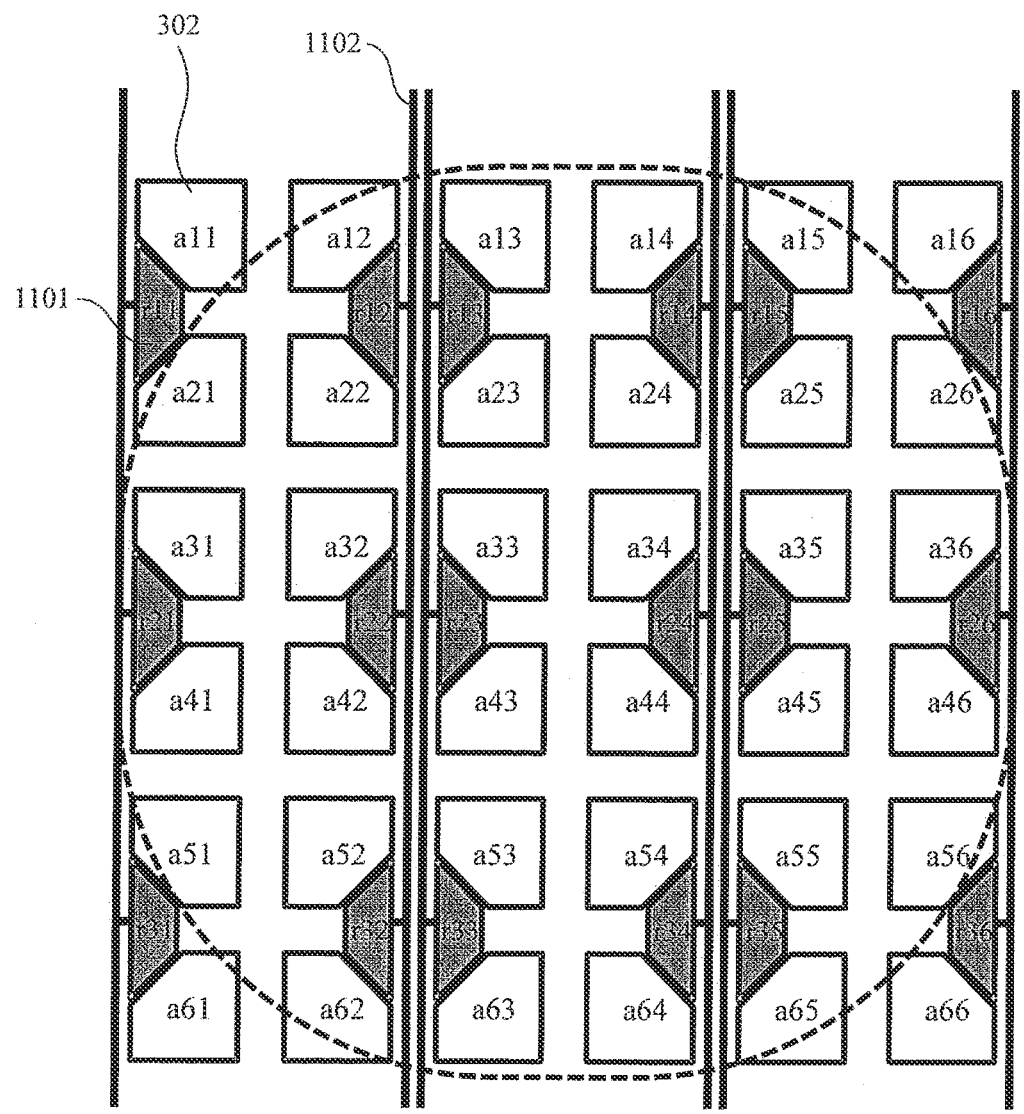
FIG. 18 is a diagram schematically illustrating the pixel reading configuration of the image pickup element in the image pickup apparatus according to Example 4 of the present invention.

FIG. 18 is a diagram illustrating a configuration of a pixel circuit of an image pickup element according to Example 4 of the present invention. The configuration of the pixel circuit of the image pickup element according to this example illustrated in FIG. 18 is different from the configuration of the pixel circuit of the image pickup element according to Example 2 illustrated in FIG. 14 in the following points. That is, in this example, each pair of vertically adjacent two divided pixels 302 shares the signal accumulation and read-out unit 1101.

In the image pickup apparatus according to this example illustrated in FIG. 18, on normal photographing, signals from the two divided pixels 302 sharing the signal accumulation and read-out unit 1101 are independently accumulated and read. Meanwhile, on LV driving, signals from the two divided pixels 302 sharing the signal accumulation and read-out unit 1101 are simultaneously transferred to the accumulation and read-out unit 1101, added and accumulated and read at one time, thereby increasing the reading speed.

Figure 19:
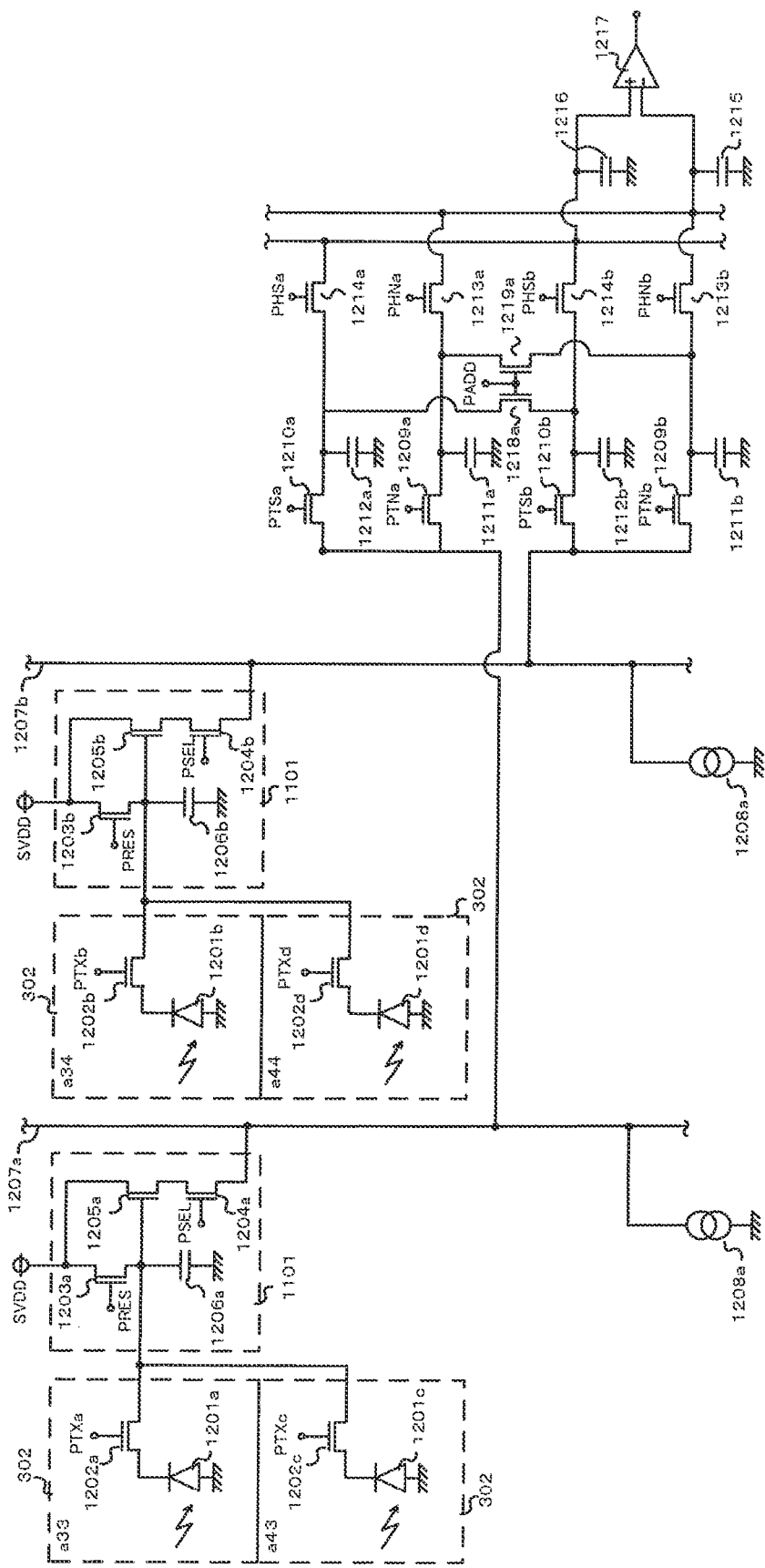
FIG. 19 is a diagram illustrating a configuration of the pixel circuit of the image pickup element including the read-out configuration in FIG. 18.

FIG. 19 is a diagram illustrating a circuit configuration of a CMOS image pickup element according to this example.

The CMOS image pickup element of this example illustrated in FIG. 19 has a configuration where one floating diffusion layer FD 1206 is connected to the two divided pixel 302. The configurations of each divided pixel 302 and the signal accumulation and read-out unit 1101 are similar to the circuit configuration of the image pickup element of Example 1 illustrated in FIG. 12.

In this example, both a signal from the divided pixel a33 and a signal from the divided pixel a43 are output to the vertical output line 1207a, and transferred to subsequent column circuit. Both a signal from the divided pixel a34 and a signal from the divided pixel a44 are output to the vertical output line 1207b, and transferred to the subsequent column circuit.

The signal output to vertical output line 1207 is accumulated in the transfer capacitor CTS 1212 by turning on the transfer gate 1210 according to the signal output pulse PTS, and accumulated in the transfer capacitor CTN 1211 by turning on the transfer gate 1209 according to the noise output pulse PTN. Subsequently, according to the control signals PHS and PHN from the horizontal scanning circuit, not illustrated, via the transfer switches 1213 and 1214, the noise component is accumulated in the capacitor CHN 1215 and the signal component is accumulated in the capacitor CHS 1216. The difference therebetween is output as a pixel signal by the differential amplifier 1217.

In the CMOS image pickup element of this example illustrated in FIG. 19, as with the CMOS image pickup element of the Example 3 illustrated in FIG. 16, the switch 1218 connected with the capacitor CTN 1211 of each column circuit, and the switch 1219 connected with the capacitor CTS 1212 of each column circuit are added. The switches 1218 and 1219 are turned on by setting the PADD signal to the high level, thereby attaining the connection.

Figure 20:
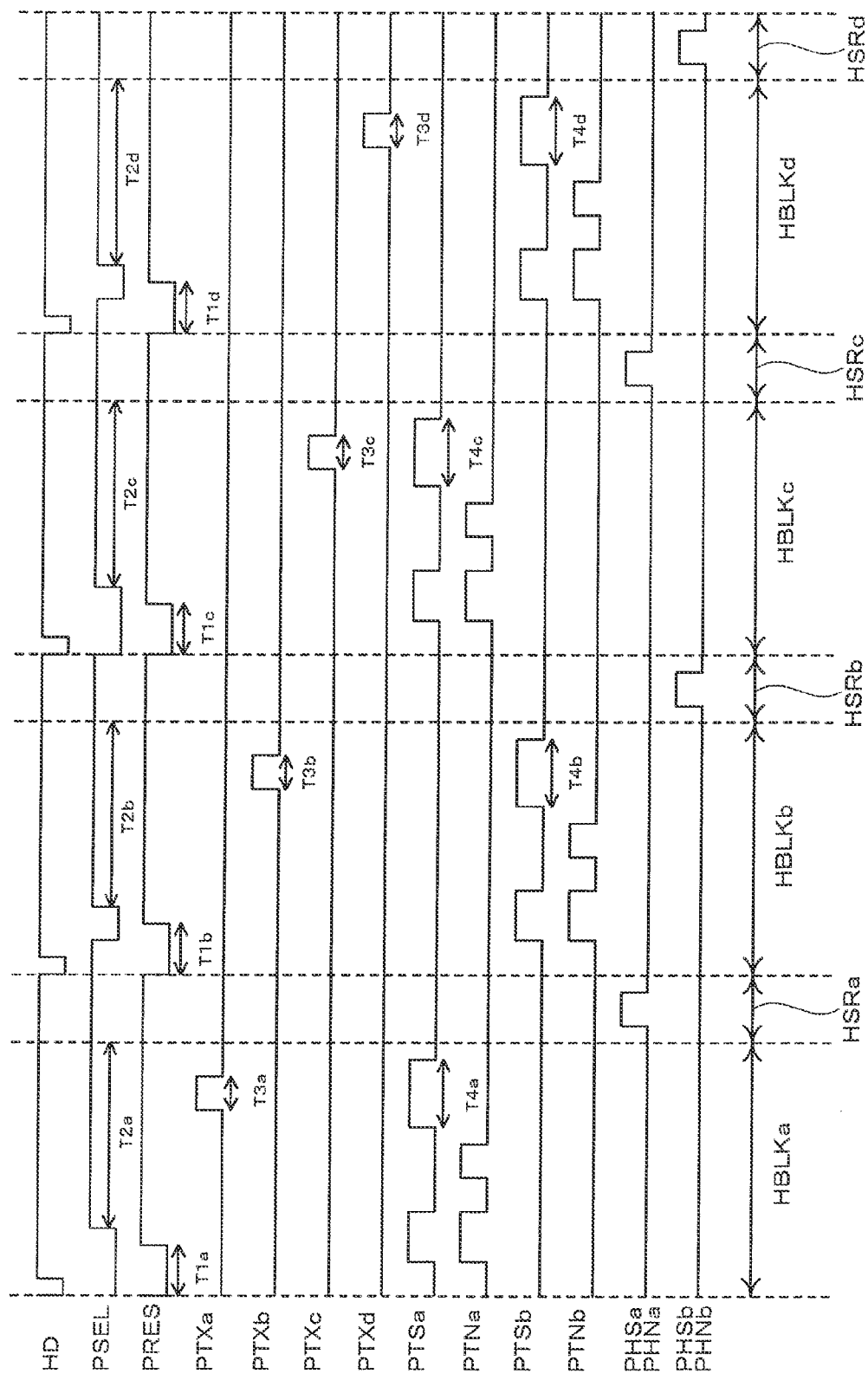
FIG. 20 is a drive timing chart of the image pickup element illustrated in FIG. 18.

FIG. 20 is a timing chart illustrating a first drive timing according to this example.

The first drive timing illustrated in FIG. 20 is drive timing in the case of normal photographing, at which divided pixel output signals of the respective divided pixels illustrated in FIG. 18 are independently read. In the case of signal reading according to the first drive timing, the output signal of the divided pixel can be used as a signal that can be reconstructed to images with various focal lengths by the digital signal processing circuit 113.

The first drive timing of the image pickup apparatus according to this example is timing where the drive timing of the image pickup apparatus according to Example 1 illustrated in FIG. 13 is subjected to the following transformation. That is, in FIG. 13, the signals PTSa and the signal PTSc, the signal PTSb and the signal PTSd, the signal PTNa and the signal PTNc, the signal PTNb and the signal PTNd, the signals PHSa and PHNa and the signals PHSc and PHNc, and the signals PHSb and PHNb and the signals PHSd and PHNd are respective common signals. The timing of the state transition of each signal is similar to the drive timing of the image pickup apparatus according to Example 1 illustrated in FIG. 13. Accordingly, the description thereof is herein omitted.

Figure 21:
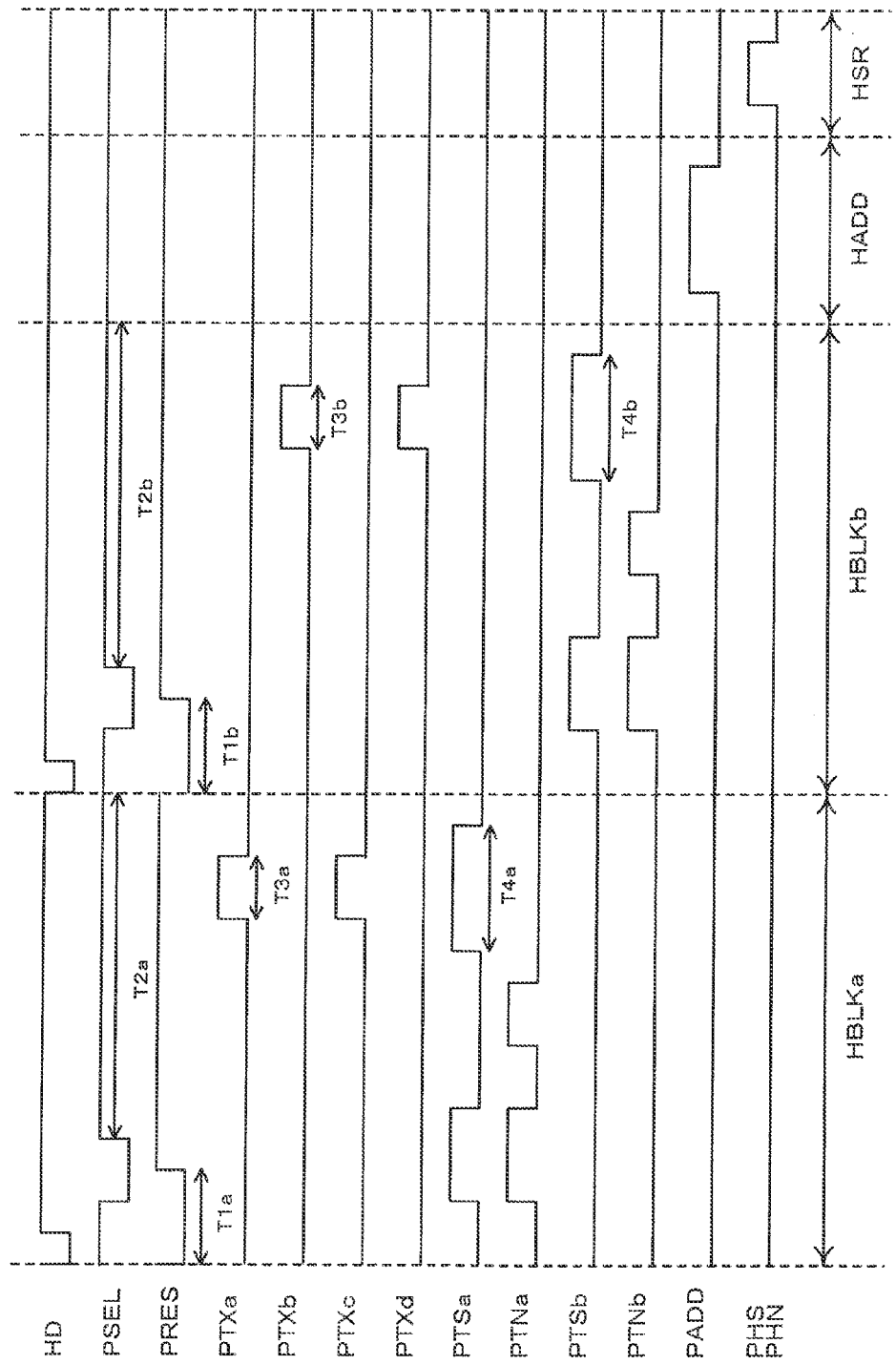
FIG. 21 is a drive timing chart of the image pickup element illustrated in FIG. 18.

FIG. 21 is a timing chart illustrating second drive timing according to this example.

The second drive timing illustrated in FIG. 21 is drive timing in the case of LV driving, at which the signals of the respective divided pixels illustrated in FIG. 18 are collectively read as a pickup pixel output signal. The signal reading according to the second drive timing results in high speed reading, while not allowing reconstruction to images with various focal lengths.

The second drive timing of the image pickup apparatus according to this example is timing where the drive timing of the image pickup apparatus according to Example 3 illustrated in FIG. 17 is subjected to the following transformation. That is, in FIG. 17, the signals PTSa and the signal PTSc, the signal PTSb and the signal PTSd, the signal PTNa and the signal PTNc, the signal PTNb and the signal PTNd, the signals PHSa and PHNa and the signals PHSc and PHNc, and the signals PHSb and PHNb and the signals PHSd and PHNd are respective common signals. The timing of the state transition of each signal is similar to the drive timing of the image pickup apparatus according to Example 3 illustrated in FIG. 17. Accordingly, the description thereof is omitted.

Example 5

Next, Example 5 of the present invention will be described. Example 5 of the present invention is characterized in the pixel configuration of the image pickup element and a method of read-out from each divided pixel. The configurations and an operation sequence of an image pickup apparatus are similar to those in Example 1 described using FIGS. 1 to 10. Accordingly, the description thereof is herein omitted.

Figure 22:
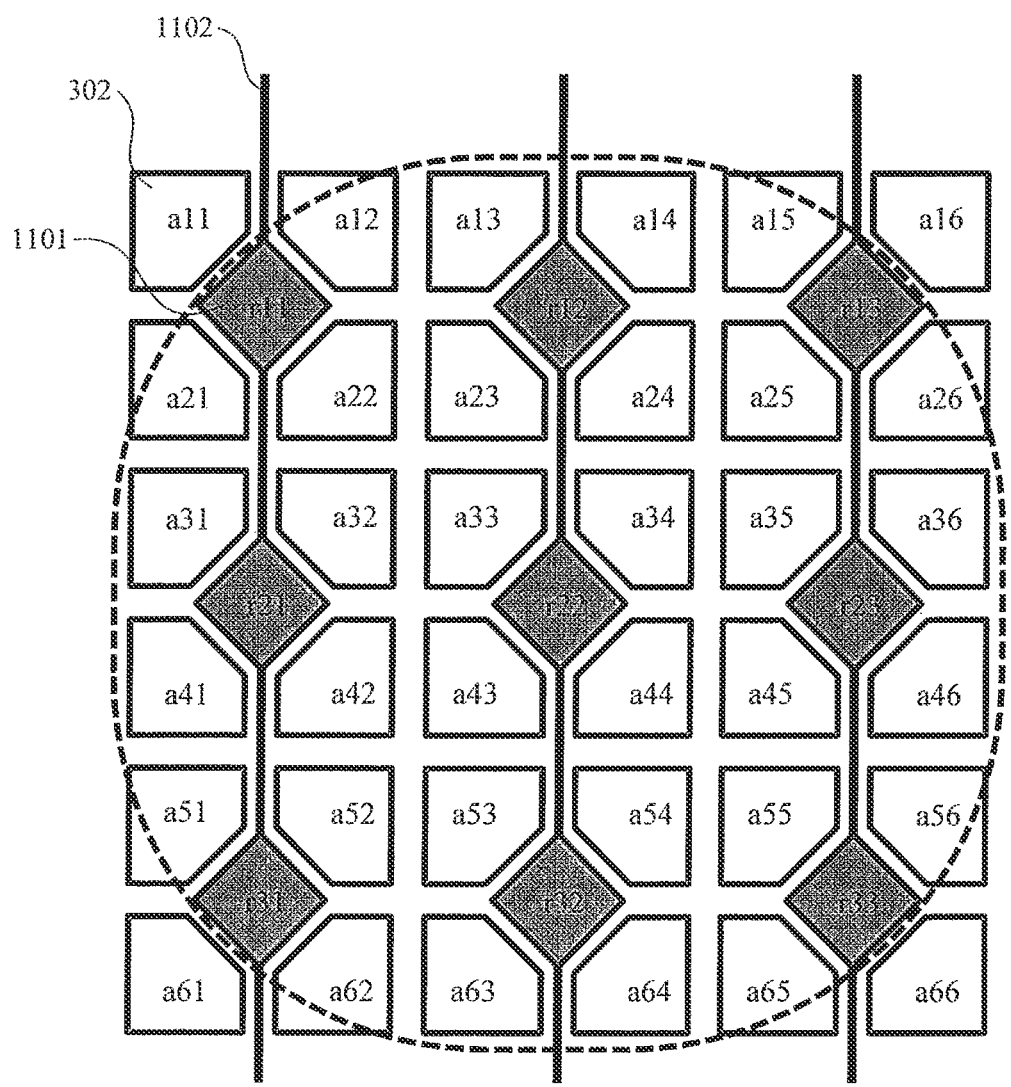
FIG. 22 is a diagram schematically illustrating a pixel reading configuration of the image pickup element in the image pickup apparatus according to Example 5 of the present invention.

FIG. 22 is a diagram illustrating a circuit configuration of an image pickup element according to this example.

FIG. 22 illustrates a signal accumulation and read-out unit 1101 that converts charges photoelectrically converted in the divided pixel 302, into voltages and outputs the voltages, and a vertical output line 1102 that is a path through which the electric signal output from the signal accumulation and read-out unit 1101 is output.

The image pickup element of this example illustrated in FIG. 22 has a configuration where one signal accumulation and read-out unit 1101 is connected to four divided pixels 302. More specifically, electric signals photoelectrically converted from optical signals incident on divided pixels a11, a12, a21 and a22 are transferred to a signal accumulation and read-out unit r11 and accumulated therein, and subsequently output to the vertical output line 1102. Likewise, electric signals photoelectrically converted from optical signals incident on divided pixels a33, a34, a43 and a44 are transferred to a signal accumulation and read-out unit r22 and accumulated therein, and subsequently output to the vertical output line 1102.

In the case of normal photographing, the image pickup apparatus according to this example independently accumulates signals from four divided pixels 302 sharing the signal accumulation and read-out unit 1101 and reads the signals. Meanwhile, in the case of LV driving, the apparatus simultaneously transfers signals from the four divided pixels 302 sharing the signal accumulation and read-out unit 1101 to the signal accumulation and read-out unit 1101 to add and accumulate the signals, and reads the signals at one time, thereby increasing the reading speed.

Figure 23:
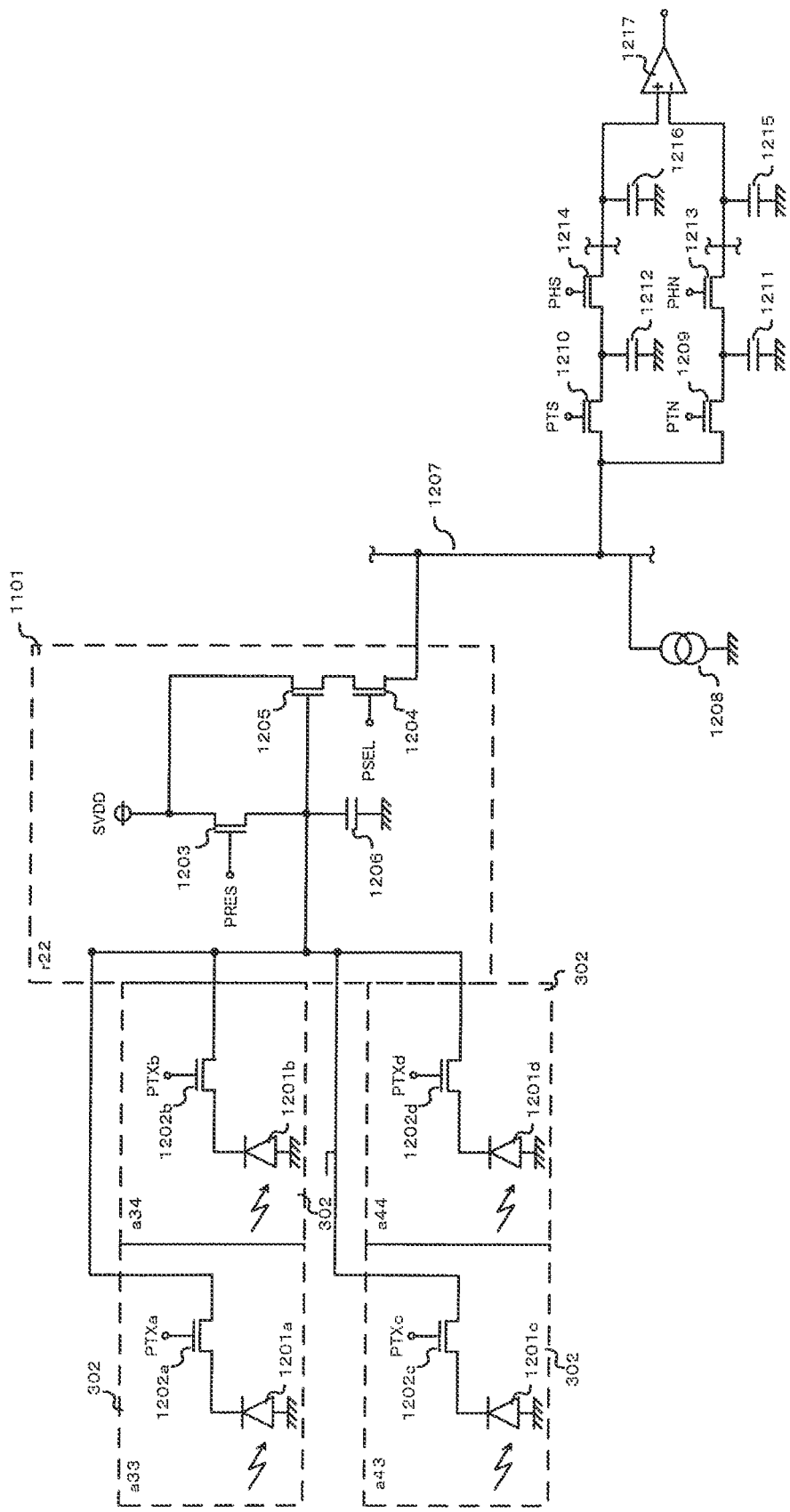
FIG. 23 is a diagram illustrating the configuration of a pixel circuit of the image pickup element including the read-out configuration in FIG. 22.

FIG. 23 is a diagram illustrating a circuit configuration of a CMOS image pickup element according to this example.

The CMOS image pickup element of this example illustrated in FIG. 23 has a configuration where one floating diffusion layer FD 1206 is connected to four divided pixels 302.

In FIG. 23, a pixel region of an image pickup element 103 includes a plurality of divided pixels 302 arranged for one recording pixel, and a pixel common unit 1101 arranged for four divided pixels.

The divided pixel 302 includes a photodiode 1201 that is a photoelectric conversion element, and a transfer switch 1202 that transfers charges generated by photoelectric conversion in the photodiode 1201 according to pulses PTX.

The pixel common unit 1101 includes the floating diffusion layer FD 1206 that accumulates charges transmitted by the transfer switches 1202 of the respective divided pixels 302, and a reset switch 1203 that resets the floating diffusion layer FD 1206 connected to the gate of the pixel amplifier 1205 to the level of the potential SVDD according to the reset pulses PRES. This unit further includes the pixel amplifier 1205 that amplifies the charges accumulated in the floating diffusion layer FD 1206 as the source follower, and a row selection switch 1204 that selects the row pixel selected by the vertical scanning circuit, not illustrated, according to the selection pulses PSEL.

In the configuration of the pixel unit of the image pickup element illustrated in FIG. 23, all the charges photoelectrically converted by the photodiodes 1201a, 1201b, 1201c and 1201d are transferred to the floating diffusion layer FD 1206 by controlling the transfer switches 1202a, 1202b, 1202c and 1202d.

The charges in the pixels in the row direction selected by the row selection switch 1204 are output through the vertical output line 1207 to the load current source 1208 by the source follower. Next, the signal output pulse PTS turns on the transfer gate 1210 to accumulate the charges in the transfer capacitor CTS 1212, and the noise output pulse PTN turns on the transfer gate 1209 to accumulate charges in the transfer capacitor CTN 1211. Subsequently, the control signals PHS and PHN from the horizontal scanning circuit, not illustrated, turns on the transfer switches 1213 and 1214. The noise component is accumulated in the capacitor CHN 1215, and the signal component is accumulated in the capacitor CHS 1216. The difference therebetween is output as a pixel signal by the differential amplifier 1217.

Figure 24:
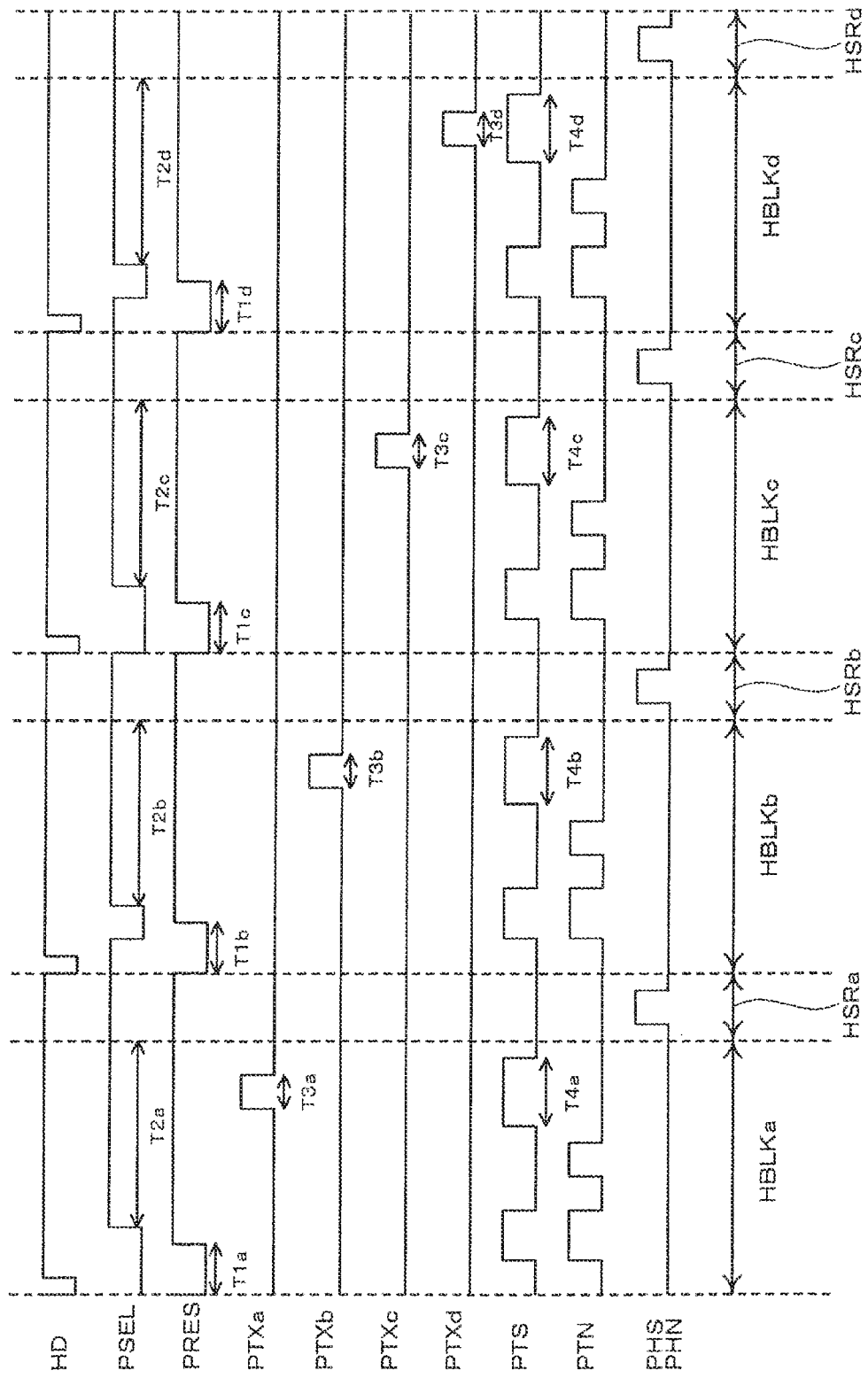
FIG. 24 is a drive timing chart of the image pickup element illustrated in FIG. 23.

FIG. 24 is a timing chart illustrating the first drive timing according to this example.

The first drive timing illustrated in FIG. 24 is drive timing on normal photographing, at which divided pixel output signals of the respective divided pixels illustrated in FIG. 22 are independently read. The signal reading according to the first drive timing allows the divided pixel output signal to be used in the digital signal processing circuit 113 as a signal that can be reconstructed to images with various focal lengths.

In driving according to the timing chart of FIG. 24, for instance, a configuration of sequential reading in the order of the divided pixels a33, a34, a43 and a44.

First, in a time period of HBLKa+HSRa, a signal of the divided pixel a33 is read. As a signal HD indicating start of one horizontal scanning time period falls, the vertical output line 1207 is reset to the constant potential by a circuit, not illustrated. Subsequently, the PRES signal turns on the MOS transistor 1203, thereby allowing charges accumulated in the floating capacitor 1206 provided at the gate of the MOS transistor 1205 to be reset to a constant potential SVDD in a time period T1a.

Subsequently, the PRES signal is set to a high level, the MOS transistor 1203 is turned OFF, and subsequently, a PSEL signal is set to a high level. Accordingly, the source follower circuit including the MOS transistor 1205 and the load current source 1208 becomes in an operating state. Thus, noise is output to the vertical output line 1207 according to a floating gate reset potential of the MOS transistor 1205. A PTN signal is set to the high level in a time period during which PSEL is high, thereby allowing the accumulation capacitor CTN 1211 accumulating the noise component to be connected to the vertical output line 1207. The accumulation capacitor CTN 1211 holds a signal of the noise component.

What is subsequently performed is accumulation of a mixed signal of photocharges generated in the photoelectric conversion element and the noise component. First, the vertical output line 1207 is reset to a constant potential by a circuit, not illustrated. Subsequently, a PTXa signal is set to the high level. The transfer MOS transistor 1202a is turned on, thereby allowing the photocharges accumulated in the photoelectric conversion element 1201a to be transferred to the floating gate of the MOS transistor 1205 in a time period T3a. At this time, the PSEL signal is maintained at the high level. Accordingly, the source follower circuit is becomes an operating state. The "optical signal+noise signal" corresponding to the potential of the floating gate of the MOS transistor 1205 is output to the vertical output line 1207. In a time period T4a including the time period T3a, the PTS signal is set to the high level. Accordingly, the accumulation capacitor CTS 1212 that accumulates "the photocharge component+the noise component" is connected to the vertical output line 1207. Accordingly, the accumulation capacitor CTS 1212 holds the signal of the photocharge component+the noise component.

As described above, the noise component of one line and the optical signal generated in the photodiode+the noise component are accumulated in the CTN 1211 and CTS 1212, respectively.

Next, in a time period HSRa, arrangement of the two signals are transferred according to control pulses PHS and PHN controlled by a horizontal shift register, not illustrated, to the capacitors CHN 1215 and CHS 1216, respectively. The noise component and the optical signal+the noise component accumulated in the respective capacitors CHN 1215 and CHS 1216 are output by the differential amplifier 1217 as a difference between (the optical signal+the noise component) and the noise component, i.e., the optical signal.

Subsequently, in a time period of HBLKb+HSRb, control signals PTXb, PRES and PSEL are controlled, thereby reading the signal of the divided pixel a34. The timing of reading the signal of the divided pixel a34 is similar to the aforementioned timing of reading the signal of the divided pixel a33. Accordingly, the description thereof is herein omitted.

Likewise, in a time period of HBLKc+HSRc, the control signals PTXc, PRES and PSEL are controlled, thereby reading the signal of the divided pixel a43. In a time period of HBLKd+HSRd, control signals PTXd, PRES and PSEL are controlled, thereby reading the signal of the divided pixel a44. Thus, signal reading of the four divided pixels a33, a34, a43 and a44 arranged in 2×2 is completed.

Figure 25:
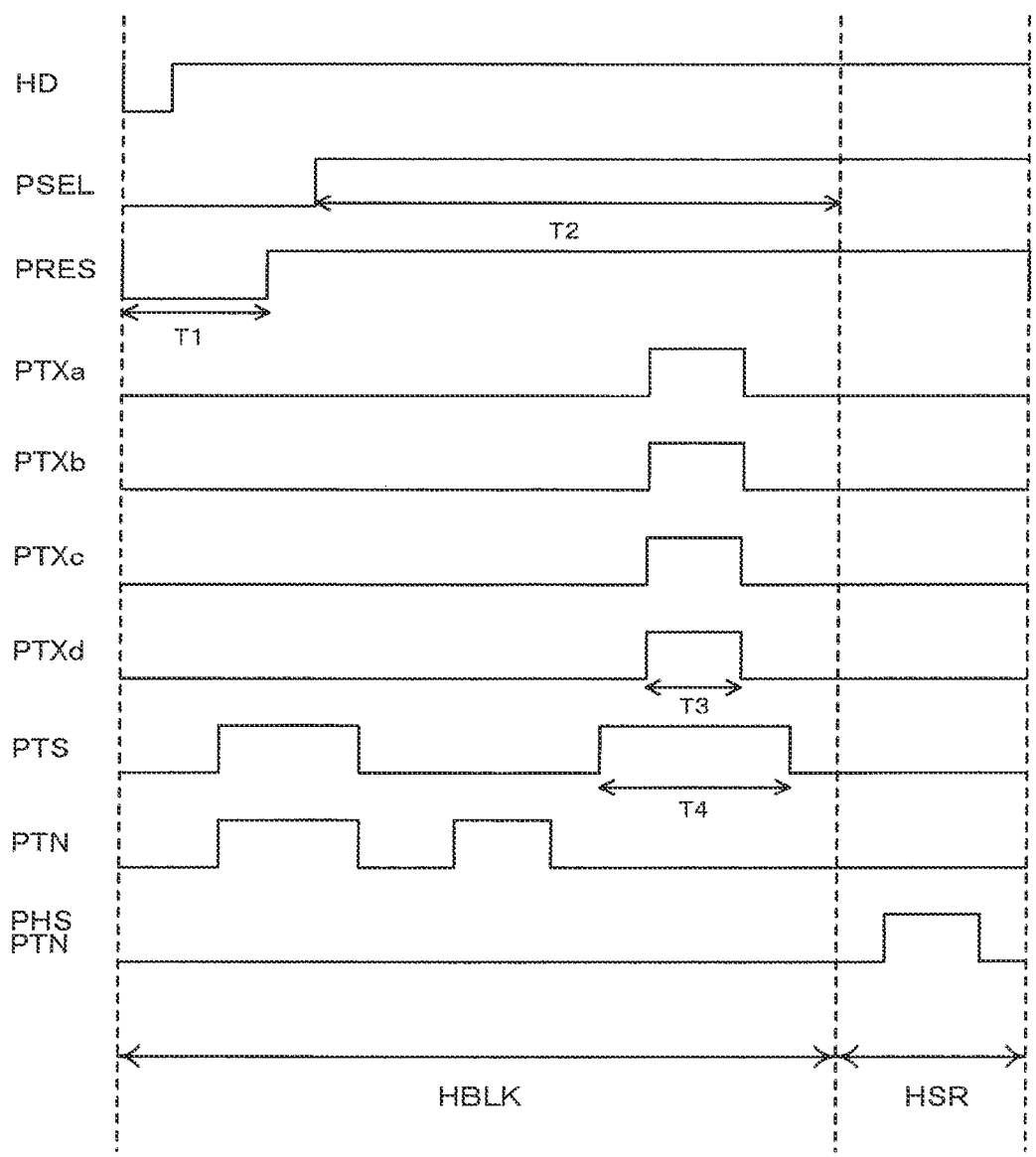
FIG. 25 is a drive timing chart of the image pickup element illustrated in FIG. 23.

FIG. 25 is a timing chart illustrating second drive timing according to this example.

The second drive timing illustrated in FIG. 25 is drive timing on LV driving, at which the signals in the respective divided pixels illustrated in FIG. 12 are collectively read as a pixel output signal. The signal reading according to the second drive timing results in high speed reading, while not allowing reconstruction to images with various focal lengths.

The drive timing of FIG. 25 sets the PTN signal to a high level in a time period during which the PSEL signal is at a high level and causes the accumulation capacitor CTN 1211 to hold the noise component. Up to this stage, the timing is similar to the first drive timing illustrated in FIG. 24.

Subsequently, a mixed signal of the photocharge generated in the photoelectric conversion element and the noise component is accumulated. First, the vertical output line 1207 is reset to a constant potential by a circuit, not illustrated. Subsequently, the PTXa, PTXb, PTXc and PTXd signals are set to high levels only in a time period T3, and the transfer MOS transistor 1202 is turned on. Accordingly, the photocharges accumulated in the photoelectric conversion units 1201*a*, 1201*b*, 1201*c* and 1201*d* are transferred to the floating gate of the MOS transistor 1205 in the time period T3. At this time, the PSEL signal is left at the high level. Accordingly, the source follower circuit comes into the operating state, and "the optical signal+the noise signal" corresponding to the potential of the floating gate of MOS transistor 1204 is output to the vertical output line 1207. The PTS signal is set to the high level in the time period T3 including the time period T4. Accordingly, the accumulation capacitor CTS 1212 that accumulates "the photocharge component+the noise component" is connected to the vertical output line 422, and the accumulation capacitor CTS 1212 holds the signal of the photocharge component+the noise component.

As described above, one line of the noise component, and the optical signal generated in the photodiode+noise component are accumulated in the CTN 1211 and the CTS 1212, respectively.

Next, in a time period HSR, the arrangement of the two signals is controlled according to control pulses PHS and PHN controlled by a horizontal shift register, not illustrated, to the capacitors CHN 1215 and CHS 1216, respectively. The noise component, and the optical signal+the noise component that are accumulated in the respective capacitors CHN 1215 and CHS 1216 are output as the difference, i.e. an optical signal, between (the optical signal+the noise component) and the noise component by the differential amplifier 1217. Thus, reading of a signal acquired by adding the signals of the four divided pixels a33, a34, a43 and a44 arranged in 2×2 is completed.

The image pickup apparatuses according to the examples of the present invention have thus been described using FIGS. 1 to 25. However, the present invention is not limited thereto. Various modes can be adopted.

For instance, for easily understandable description, the pixel configurations of the examples of the present invention adopt the divided pixels under the identical microlens that have 6×6-divided configuration. However, the present invention is not limited thereto. Configurations having various number and shapes of divided pixels may be adopted.

On the example of the present invention having been described using FIG. 1, the description has been made such that the image processing, such as image reconstruction, is performed by the digital signal processing circuit 113, which is a configurational element of the image pickup apparatus. The image processing is not necessarily executed in the image pickup apparatus. More specifically, the image processing unit may be provided in an apparatus, i.e. PC (personal computer), which is different from the image pickup apparatus, an image pickup data acquired by the image pickup apparatus may be transferred to the PC, and then the image processing may be applied in the PC.

The units configuring the image pickup apparatus and the steps of the control method according to the examples of the present invention can be realized by operation of a program stored in RAM or ROM of a computer. The program and a computer readable storage medium storing this program are included in the present invention.

The present invention can be implemented as, for instance, an example of a system, an apparatus, a method, a program or a storage medium. More particularly, the present invention may be applied to a system including plural pieces of equipment, or to an apparatus configured by a single piece of equipment.

The present invention includes a case where a program of software realizing functions of the examples is directly or remotely supplied to the system or the apparatus. The present invention also includes a case of being attained by the computer of the system or the apparatus reading and executing the supplied program codes.

Accordingly, to realize the functional processes of the present invention by the computer, the program codes themselves installed in the computer also realize the present invention. That is, the present invention includes the computer program itself for realizing the functional processes of the present invention. In this case, only provided that the functions of the program are included, modes of an object code, a program executed by an interpreter, or a script data supplied to OS may be adopted.

The storage medium to store the program may be, for instance, a flexible disk, a hard disk, an optical disk, or a magneto-optical disk. Furthermore, the medium may be MO, CD-ROM, CD-R, CD-RW, a magnetic tape, a non-volatile memory card, ROM, DVD (DVD-ROM, DVD-R).

Moreover, a method of supplying the program may be a method of connection to a web page on the Internet using a browser in a client computer. The computer program itself of the present invention or a file that is compressed and includes an automatic installation function is downloaded from the web page to a storage medium, such as a hard disk, thus also allowing the program to be supplied.

Program codes configuring the program of the present invention may be divided into a plurality of files, and downloaded from different web pages, thereby also enabling the present invention to be realized. That is, the present invention also includes a www server by which program files to realize the functional processes of the present invention in the computer are downloaded to a plurality of users.

In another method of the present invention, the program of the present invention is encrypted, stored in a storage medium, such as CD-ROM, supplied to users, and users satisfying prescribed requirements are allowed to download key information for decryption from a web page via the Internet. Use of the key information allows the encrypted program to be executed and installed on the computer, thus also realizing the present invention.

The computer executes the read program, thereby realizing the functions of the embodiments. Furthermore, based on instructions of the program, OS operating on the computer executes a part of or the entire actual processes, thereby allowing the functions of the embodiments to be realized.

According to still another method, the program read from the storage medium is written in a memory included in a function extension board inserted in a computer or a function extension unit connected to the computer. Based on the instructions of the program, the CPU included in the function extension board or the function extension unit executes a part or the entire actual processes, thereby also allowing the functions of the embodiments to be realized.

This application claims the benefit of Japanese Patent Application No. 2012-005674, filed Jan. 13, 2012, which is hereby incorporated by reference herein in its entirety.

The invention claimed is:

1. An image pickup apparatus including an image pickup element including a two-dimensional arrangement of a plurality of photoelectric converters configured to convert an optical image formed by a photographing lens into an electric signal, and a microlens array arranged between the photographing lens and the image pickup element, wherein each microlens of the microlens array corresponds to one of pixel blocks provided by dividing the two-dimensional array of the plurality of photoelectric converters on a unit basis of a pixel block of a predetermined number of photoelectric converters, the image pickup apparatus comprising:
   a photographing mode setting unit configure to switch between a first photographing mode and a second photographing mode, a number of the photoelectric converters whose electric signals are to be read in the second photographing mode being smaller than that in the first photographing mode, the photoelectric converter, which is located around a location at which a light ray passing through a center of the photographing lens arrives, being to be read and the photoelectric converter, which is located outermost circumference of the pixel block, being to be read in the first photographing mode, and the photoelectric converter, which is located around the location at which the light ray passing through the center of the photographing lens arrives, being to be read and the photoelectric converter, which is located the outermost circumference of the pixel block, being not to be read in the second photographing mode;
   a signal read-out unit configured to read the electric signal converted by the photoelectric converter; and
   a control unit configured to control the signal read-out unit according to the photographing mode set by the photographing mode setting unit to change the photoelectric converter to be used for signal reading of the signal read-out unit among the photoelectric converter included in each pixel block.

2. The image pickup apparatus according to claim 1, further comprising
   a signal processing unit configure to process the electric signal read by the signal read-out unit,
   wherein the signal processing unit changes a gain according to the number of photoelectric converters to be used for signal reading by the signal read-out unit.

3. The image pickup apparatus according to claim 1, wherein the signal read-out unit comprises a read-out line that reads the electric signal from the photoelectric converter in a column direction of the two-dimensional arrangement, and each of photoelectric converter on a same column is connected to a common read-out line via signal accumulation and read-out unit.

4. The image pickup apparatus according to claim 1, wherein the signal read-out unit comprises a read-out line that reads the electric signal from the photoelectric converter in a column direction of the two dimensional arrangement, and each of photoelectric converter on a same column is alternately connected to a different common read-out line via signal accumulation and read-out unit.

5. The image pickup apparatus according to claim 1, wherein the signal read-out unit comprises a read-out line that reads the electric signal from the photoelectric converter in a column direction of the two dimensional arrangement, and the photoelectric converter adjacent to each other on a same column are connected to a common read-out line via a common signal accumulation and read-out unit.

6. The image pickup apparatus according to claim 1, wherein the signal read-out unit comprises a read-out line through which the electric signal from the photoelectric converter in a column direction of the two-dimensional arrangement is read, and the photoelectric converter arranged on adjacent rows among the photoelectric converter on adjacent columns are connected to a common read-out line via a common signal accumulation and read-out unit.

7. The image pickup apparatus according to claim 1, further comprising an image display unit configured to display a photographed image,
   wherein the first photographing mode is a photographing mode for recording the photographed image in a recording unit, and the second photographing mode is a live view mode for displaying the photographed image on the display unit in real time.

8. The image pickup apparatus according to claim 1, wherein, in a case where the second photographing mode is set, the control unit reduces the number of photoelectric converters to be used for signal reading in each pixel block to be smaller in comparison with a case where the first photographing mode is set.

9. The image pickup apparatus according to claim 1, wherein, in a case where the second photographing mode is set, the control unit sets the photoelectric converter to be used for signal reading in each pixel block to the photoelectric converter around a location at which a light ray passing through a center of the photographing lens and a center of the microlens arrives.

10. The image pickup apparatus according to claim 1, wherein the control unit controls the signal read-out unit such that, in a case where the second photographing mode is set, a part or all of electric signals from photoelectric converters to be used for signal reading in each pixel block are added and read.

11. A method of controlling an image pickup apparatus including an image pickup element including a two-dimensional arrangement of photoelectric converter configured to convert an optical image formed by a photographing lens into an electric signal, and a microlens array arranged between the photographing lens and the image pickup element, wherein each microlens of the microlens array corresponds to one of pixel blocks provided by dividing the two-dimensional array of the plurality of photoelectric converters by a pixel block of a predetermined number of photoelectric converters, the method comprising:
   setting a photographing mode by switching between a first photographing mode and a second photographing mode, a number of the photoelectric converters whose electric signals are to be read in the second photographing mode being smaller than that in the first photographing mode, the photoelectric converter, which is located around a location at which a light ray passing through a center of the photographing lens arrives, being to be read and the photoelectric converter, which is located outermost circumference of the pixel block, being to be read in the first photographing mode, and the photoelectric converter, which is located around the location at which the light ray passing through the center of the photographing lens arrives, being to be read and the photoelectric converter, which is located the outermost circumference of the pixel block, being not to be read in the second photographing mode;
   reading the electric signal converted by the photoelectric converter; and
   setting to change the photoelectric converter to be used for signal reading of the signal read-out among the photoelectric converter included in each pixel block.

12. A non-transitory computer-readable storage medium storing a program for controlling an image pickup apparatus including an image pickup element including a two-dimensional arrangement of a plurality of photoelectric converters configured to convert an optical image formed by a photographing lens into an electric signal, and a microlens array arranged between the photographing lens and the image pickup element, wherein each microlens of the microlens array corresponds to one of pixel blocks provided by dividing the two-dimensional array of the plurality of photoelectric converters by a pixel block of a predetermined number of photoelectric converters, the program causing a computer to function as:

a photographing mode setting unit for switching between a first photographing mode and a second photographing mode, a number of the photoelectric converters whose electric signals are to be read in the second photographing mode being smaller than that in the first photographing mode, the photoelectric converter, which is located around a location at which a light ray passing through a center of the photographing lens arrives, being to be read and the photoelectric converter, which is located outermost circumference of the pixel block, being to be read in the first photographing mode, and the photoelectric converter, which is located around the location at which the light ray passing through the center of the photographing lens arrives, being to be read and the photoelectric converter, which is located the outermost circumference of the pixel block, being not to be read in the second photographing mode;

a signal read-out unit for reading the electric signal converted by the photoelectric converter; and a control unit for controlling the signal read-out according to the photographing mode set by the photographing mode setting to change the photoelectric converter to be used for signal reading of the signal read-out among the photoelectric converter included in each pixel block.

13. An image pickup apparatus including an image pickup element including a two-dimensional arrangement of a plurality of photoelectric converters configured to convert an optical image formed by a photographing lens into an electric signal, and a microlens array arranged between the photographing lens and the image pickup element, wherein each microlens of the microlens array corresponds to one of pixel blocks provided by dividing the two-dimensional array of the plurality of photoelectric converters on a unit basis of a pixel block of a predetermined number of photoelectric converters, the image pickup apparatus comprising:

a photographing mode setting unit configure to switch between a first photographing mode and a second photographing mode, a number of the photoelectric converters whose electric signals are to be read in the second photographing mode being smaller than that in the first photographing mode, and the photoelectric converter, which is located around a location at which a light ray passing through a center of the photographing lens arrives, being to be read in the second photographing mode;

a signal read-out unit configured to read the electric signal converted by the photoelectric converter; and a control unit configured to control the signal read-out unit according to the photographing mode set by the photographing mode setting unit to change the photoelectric converter to be used for signal reading of the signal read-out unit among the photoelectric converter included in each pixel block, wherein the signal read-out unit comprises a read-out line that reads the electric signal from the photoelectric converter located around the location at which the light ray passing through the center of the photographing lens arrives, at least parts of the electric signals from the photoelectric converters, which are located around the location at which the light ray passing through the center of the photographing lens arrives, being mixed, and the mixed electrical signal being to be read-out through the read-out line, and in a case where the second photographing mode is set, at least the parts of the electric signals from the photoelectric converters are to be mixed in the each pixel block, and the mixed electrical signals are to be read-out by the control unit through the read-out line by controlling the signal read-out unit.

* * * * *